US012764424B2

(12) United States Patent
Vacquerie et al.

(10) Patent No.: US 12,764,424 B2
(45) Date of Patent: Oct. 13, 2026

(54) METHODS AND APPARATUS FOR REAL-TIME GUIDED ENCODING

(71) Applicant: GoPro, Inc., San Mateo, CA (US)

(72) Inventors: Vincent Vacquerie, Paris (FR); Alexis Lefebvre, Paris (FR)

(73) Assignee: GoPro, Inc., San Mateo, CA (US)

( * ) Notice: Subject to any disclaimer, the term of this patent is extended or adjusted under 35 U.S.C. 154(b) by 75 days.

(21) Appl. No.: 18/701,256

(22) PCT Filed: Feb. 7, 2023

(86) PCT No.: PCT/US2023/062157

§ 371 (c)(1),
(2) Date: Apr. 15, 2024

(87) PCT Pub. No.: WO2023/150800

PCT Pub. Date: Aug. 10, 2023

(65) Prior Publication Data

US 2025/0008227 A1 Jan. 2, 2025

Related U.S. Application Data

(60) Provisional application No. 63/267,608, filed on Feb. 7, 2022.

(51) Int. Cl.
*H04N 23/80* (2023.01)
*H04N 19/117* (2014.01)

(52) U.S. Cl.
CPC ........... *H04N 23/80* (2023.01); *H04N 19/117* (2014.11)

(58) Field of Classification Search
CPC .... H04N 23/80; H04N 23/617; H04N 19/527; H04N 19/117; H04N 19/139;
(Continued)

(56) References Cited

U.S. PATENT DOCUMENTS 5,649,032 A 7/1997 Burt
6,389,179 B1 5/2002 Katayama
(Continued)

FOREIGN PATENT DOCUMENTS

CN 101317461 12/2008
CN 104735464 A 6/2015
(Continued)

OTHER PUBLICATIONS

Bhat, Madhukar, Jean-Marc Thiesse, and Patrick Le Callet. "A case study of machine learning classifiers for real-time adaptive resolution prediction in video coding." 2020 IEEE International Conference on Multimedia and Expo (ICME). IEEE, 2020. 7 pages.
(Continued)

*Primary Examiner* — Hung H Lam
(74) *Attorney, Agent, or Firm* — Wang Hardoon, P.C.

(57) ABSTRACT

Systems, apparatus, and methods for real-time guided encoding. In one exemplary embodiment, an image processing pipeline (IPP) is implemented within a system-on-a-chip (SoC) that includes multiple stages, ending with a codec. The codec compresses video obtained from the previous stages into a bitstream for storage within removable media (e.g., an SD card), or transport (over e.g., Wi-Fi, Ethernet, or similar network). While most hardware implementations of real-time encoding allocate bit rate based on a limited look-forward (or look-backward) of the data in the current pipeline stage, the exemplary IPP leverages real-time guidance that was collected during the previous stages of the pipeline.

18 Claims, 7 Drawing Sheets

(58) Field of Classification Search

CPC .. H04N 23/6811; H04N 23/683; H04N 19/85; G06T 5/60; G06T 5/90; G06T 2207/10016; G06T 2207/20084; G06T 2207/20182; G06T 5/50; G06T 5/70

See application file for complete search history.

(56) References Cited

U.S. PATENT DOCUMENTS

| | | | | |
|---|---|---|---|---|
| 8,135,068 | B1 | 3/2012 | Alvarez | |
| 8,315,307 | B2 * | 11/2012 | Chen | H04N 19/31 375/240.12 |
| 8,606,073 | B2 | 12/2013 | Woodman | |
| 8,665,942 | B2 | 3/2014 | Segall | |
| 8,923,400 | B1 | 12/2014 | Alvarez | |
| 9,088,798 | B2 | 7/2015 | Kato | |
| 9,171,577 | B1 | 10/2015 | Newman | |
| 9,277,122 | B1 | 3/2016 | Imura | |
| 9,286,839 | B2 | 3/2016 | Okuda | |
| 9,355,433 | B1 | 5/2016 | Adsumilli | |
| 9,369,689 | B1 | 6/2016 | Tran | |
| 9,478,054 | B1 | 10/2016 | Lewis | |
| 9,575,803 | B2 | 2/2017 | Chauvet | |
| 9,681,111 | B1 | 6/2017 | Newman | |
| 9,681,140 | B2 | 6/2017 | Le Leannec | |
| 9,774,855 | B2 | 9/2017 | Gao | |
| 10,163,029 | B2 | 12/2018 | Doshi | |
| 10,163,030 | B2 | 12/2018 | Doshi | |
| 10,257,526 | B2 | 4/2019 | Luginbuhl | |
| 10,269,326 | B2 | 4/2019 | Hasselgren | |
| 10,509,982 | B2 | 12/2019 | Doshi | |
| 11,902,580 | B2 | 2/2024 | Menon | |
| 2001/0047517 | A1 * | 11/2001 | Christopoulos | H04N 19/46 375/E7.181 |
| 2003/0007567 | A1 | 1/2003 | Newman | |
| 2003/0035047 | A1 | 2/2003 | Katayama | |
| 2003/0234866 | A1 | 12/2003 | Cutler | |
| 2005/0226483 | A1 | 10/2005 | Geiger | |
| 2005/0276501 | A1 | 12/2005 | Nakayama | |
| 2006/0109900 | A1 * | 5/2006 | Shen | H04N 19/136 375/240.03 |
| 2006/0159352 | A1 | 7/2006 | Ishtiaq | |
| 2006/0188014 | A1 | 8/2006 | Civanlar | |
| 2006/0256397 | A1 | 11/2006 | Cui | |
| 2006/0268131 | A1 | 11/2006 | Cutler | |
| 2007/0064800 | A1 | 3/2007 | Ha | |
| 2007/0237420 | A1 | 10/2007 | Steedly | |
| 2008/0131014 | A1 | 6/2008 | Lee | |
| 2008/0165105 | A1 | 7/2008 | Okuda | |
| 2008/0187043 | A1 | 8/2008 | Ahn | |
| 2008/0304567 | A1 | 12/2008 | Boyce | |
| 2009/0180552 | A1 | 7/2009 | Visharam | |
| 2010/0014780 | A1 | 1/2010 | Kalayeh | |
| 2010/0054628 | A1 | 3/2010 | Levy | |
| 2010/0158134 | A1 | 6/2010 | Yin | |
| 2010/0246691 | A1 | 9/2010 | Filippini | |
| 2011/0135198 | A1 | 6/2011 | Schuler | |
| 2011/0211081 | A1 | 9/2011 | Tsubaki | |
| 2012/0092453 | A1 | 4/2012 | Sun | |
| 2012/0242788 | A1 | 9/2012 | Chuang | |
| 2012/0307000 | A1 | 12/2012 | Doepke | |
| 2013/0002907 | A1 * | 1/2013 | Alvarez | H04N 19/61 348/222.1 |
| 2013/0021483 | A1 * | 1/2013 | Bennett | G06T 5/50 348/208.4 |
| 2014/0036998 | A1 | 2/2014 | Narroschke | |
| 2014/0105278 | A1 | 4/2014 | Bivolarsky | |
| 2014/0152863 | A1 | 6/2014 | Drouot | |
| 2014/0218354 | A1 | 8/2014 | Park | |
| 2014/0258552 | A1 | 9/2014 | Oyman | |
| 2015/0023433 | A1 | 1/2015 | Ninan | |
| 2015/0043655 | A1 | 2/2015 | Nilsson | |
| 2015/0049956 | A1 | 2/2015 | Kato | |
| 2015/0063449 | A1 | 3/2015 | Pearson | |
| 2015/0065803 | A1 | 3/2015 | Douglas | |
| 2015/0109468 | A1 | 4/2015 | Laroia | |
| 2015/0124877 | A1 | 5/2015 | Choi | |
| 2015/0138311 | A1 | 5/2015 | Towndrow | |
| 2015/0249813 | A1 | 9/2015 | Cole | |
| 2015/0296208 | A1 | 10/2015 | Gao | |
| 2015/0296231 | A1 | 10/2015 | Kwon | |
| 2015/0341552 | A1 | 11/2015 | Chen | |
| 2015/0341557 | A1 | 11/2015 | Chapdelaine-Couture | |
| 2015/0346832 | A1 | 12/2015 | Cole | |
| 2015/0365688 | A1 | 12/2015 | Su | |
| 2016/0012855 | A1 | 1/2016 | Krishnan | |
| 2016/0014422 | A1 | 1/2016 | Su | |
| 2016/0050423 | A1 | 2/2016 | Alshina | |
| 2016/0065947 | A1 | 3/2016 | Cole | |
| 2016/0073111 | A1 | 3/2016 | Lee | |
| 2016/0142697 | A1 | 5/2016 | Budagavi | |
| 2016/0173884 | A1 | 6/2016 | Le Leannec | |
| 2016/0241892 | A1 | 8/2016 | Cole | |
| 2016/0253795 | A1 | 9/2016 | Cole | |
| 2016/0274338 | A1 | 9/2016 | Davies | |
| 2016/0295128 | A1 | 10/2016 | Schnittman | |
| 2016/0323556 | A1 | 11/2016 | Luginbuhl | |
| 2016/0366422 | A1 | 12/2016 | Yin | |
| 2017/0178594 | A1 | 6/2017 | Hasselgren | |
| 2017/0339389 | A1 | 11/2017 | Doshi | |
| 2017/0339390 | A1 | 11/2017 | Doshi | |
| 2018/0176573 | A1 | 6/2018 | Chawla | |
| 2019/0197341 | A1 | 6/2019 | Doshi | |
| 2023/0179800 | A1 | 6/2023 | Menon | |
| 2024/0121400 | A1 | 4/2024 | Menon | |
| 2025/0247546 | A1 | 7/2025 | Thiesse | |

FOREIGN PATENT DOCUMENTS

| | | | |
|---|---|---|---|
| CN | 110996131 | X | 4/2020 |
| EP | 1162830 | A2 | 12/2001 |
| WO | 2013130071 | A1 | 9/2013 |

OTHER PUBLICATIONS

H.264/MPEG-4 AVC video coding standard (Advanced Video Coding for Generic Audiovisual Services, published Aug. 2021, 844 pages.

ITU-T P.910, Subjective Video Quality Assessment Methods for Multimedia Applications, Recommendation, International Telecommunication Union, 2022, 54 pages.

Katsenou, Angeliki V., et al. "Predicting video rate-distortion curves using textural features." 2016 Picture Coding Symposium (PCS). IEEE, 2016. 6 pages.

Katsenou, Angeliki V., Joel Sole, and David R. Bull. "Content-gnostic bitrate ladder prediction for adaptive video streaming." 2019 Picture Coding Symposium (PCS). IEEE, 2019. 6 pages.

Kazantsev, Roman, Sergey Zvezdakov, and Dmitriy S. Vatolin. "Machine-Learning-Based Method for Finding Optimal Video-Codec Configurations Using Physical Input-Video Features." DCC. 2020. 11 pages.

Menon, Vignesh V., et al. "Content-adaptive Encoder Preset Prediction for Adaptive Live Streaming." 2022 Picture Coding Symposium (PCS). IEEE, 2022. 5 pages.

Menon, Vignesh V., et al. "JND-aware Two-pass Per-title Encoding Scheme for Adaptive Live Streaming." IEEE Transactions on Circuits and Systems for Video Technology (2023). 13 pages.

Menon, Vignesh V., et al. "Opte: Online per-title encoding for live video streaming." ICASSP 2022-2022 IEEE International Conference on Acoustics, Speech and Signal Processing (ICASSP). IEEE, 2022. 5 pages.

Menon, Vignesh V., et al. "VCA: Video complexity analyzer." Proceedings of the 13th ACM multimedia systems conference. 2022. 6 pages.

NV_ENC_CONFIG Struct Reference, generated Jan. 12, 2018, 4 pages. https://ffmpeg.org/doxygen/3.3/structNV_ENC_CONFIG.html .

NV_ENC_PIC_PARAMS Struct Reference, generated Jan. 12, 2018. 8 pages. https://ffmpeg.org/doxygen/3.3/structNV_ENC_PIC_PARAMS.html.

(56) References Cited

OTHER PUBLICATIONS

NvEncodeAPI Data Structures, generated Jan. 12, 2018, 30 pages. https://ffmpeg.org/doxygen/3.3/group_ENCODER_STRUCTURE.html.
PCT Written Opinion issued in App. No. PCT/US2023/062157, filed Jul. 2, 2023, 6 pages.
Per-Title Encode Optimization, Netflix Technology Blog, Dec. 14, 2015, 22 pages. https://netflixtechblog.com/per-title-encode-optimization-7e99442b62a2.
Achanta R., et al., $q#Slic Superpixeis Gompared to State-of-the-Art Superpixei Methods,$q# IEEE Transactions on Pattern Analysis and Machine intelligence, 2012, vol. 34 (11), pp. 2274-2282.
Allene C, et al,, 'Seamless Image-based Texture Atlases Using Multi-band Blending,' Pattern Recognition, 2008. ICPR 2008. 19th International Conference on, 2008. 4 pages.
Badrinarayanan V., et al., 'Segnet: a Deep Convoiutional Encoder-Decoder Architecture for Image Segmentation,' arXiv preprint arXiv: 1511.00561, 2015. 14 pages.
Barghout L. and Sheynin J., 'Real-world scene perception and perceptual organization: Lessons from Computer Vision'. Journal of Vision, 2013, vol. 13 (9). (Abstract). 1 page.
Barghout L., $q#Visual Taxometric approach Image Segmentation using Fuzzy-Spatial Taxon Cut Yields Contextually Relevant Regions,$q# Communications in Computer and Information Science (CCIS), Springer-Verlag, 2014, pp. 163-173.
Bay H., et al., 'Surf: Speeded up Robust Features,' European Conference on Computer Vision, Springer Berlin Heidelberg, 2006, pp. 404-417.
Beier et al., $q#Feature-Based Image Metamorphosis,$q# in Computer Graphics Journal, Jul. 1992, vol. 28 (2), pp. 35-42.
Brainard R.C., et al., "Low-Resolution TV: Subjective Effects of Frame Repetition and Picture Replenishment," Bell Labs Technical Journal, Jan. 1967, vol. 46 (1), pp. 261-271.
Burt et al., $q#A Multiresolution Spline with Application to Image Mosaics,$q# in ACM Transactions on Graphics (TOG), 1983, vol. 2, No. 4, pp. 217-236.
Chan et al., $q#Active contours without edges$q#. IEEE Transactions on Image Processing, 2001, 10 (2), pp. 266-277 (hereinafter $q#Chan$q#).
Chang H., etal., 'Super-resolution Through Neighbor Embedding,' Computer Vision and Pattern Recognition, 2004. CVPR2004. Proceedings of the 2004 IEEE Computer Society Conference on, vol. 1, 2004. 8 pages.
Elen, 'Whatever happened to Ambisonics' AudioMedia Magazine, Nov. 1991. 18 pages.
Gracias, et al., $q#Fast Image Blending Using Watersheds and Graph Cuts,$q# Image and Vision Computing, 2009, vol. 27 (5), pp. 597-607.
Grois D., et al., $q#Complexity-Aware Adaptive Spatial Pre-Processing for ROI Scalable Video Coding With Dynamic Transition Region$q#, Image Processing (ICIP), 2011 18th IEEE International Conference On, IEEE, Sep. 11, 2011, pp. 741-744, XP032080597, DOI: 10.1109/ICIP.2011.6116661, ISBN: 978-1-4577-1304-0.
Grois, et al., 'Recent Advances in Region-of-Interest Video Coding' In: 'Recent Advances on Video Coding', Jul. 5, 2011 (Jul. 5, 2011), InTech, XP055257835, ISBN: 978-953-30-7181-7 DOI: 10.5772/17789, 29 pages.
Grois, et al., "Efficient Adaptive Bit-Rate Control for ROI Scalable Video Coding", Workshop on Picture Coding and Image Processing 2010; Jul. 12, 2010-Jul. 12, 2010; Nagoya, Dec. 7, 2010 (Dec. 7, 2010), XP030082089, 2 pages.
H.264 (Oct. 2012) and/or ISO/IEC 14496-10:2012, Information technology—Coding of audio-visual objects—Part 10: Advanced Video Coding, 402 pages.
Herbst E., et al., 'Occlusion Reasoning for Temporal Interpolation Using Optical Flow,' Department of Computer Science and Engineering, University of Washington, Tech. Rep. UW-CSE-09-08-01, 2009. 41 pages.
High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, 657 pages.
Ichimura D., et al., 'Slice Group Map for Mult. Interactive ROI Seal', 17. JVT Meeting; 74. MPEG Meeting; Oct. 14, 2005-Oct. 21, 2005; Nice, FR;(Joint Video Team of ISO/IEC JTC1/SC29/WG11 and ITU-T SG.16), No. JVT-Q020r1, Oct. 14, 2005 (Oct. 14, 2005), XP030006183, ISSN: 0000-0413. 20 pages.
Jakubowski M., et al., 'Block-based motion estimation algorithmsa survey,' Opto-Eiectronics Review 21, No. 1 (2013), pp. 88-102.
Kendall A., et al., 'Bayesian Segnet: Model Uncertainty in Deep Convolutional Encoder-Decoder Architectures for Scene Understanding,' arXiv: 1511.02680, 2015. (11 pages).
Lowe, David G. "Object recognition from local scale-invariant features." In Computer vision, 1999. The proceedings of the seventh IEEE international conference on, vol. 2, pp. 1150-1157. IEEE 1999. (Year: 1999).
Mitzel D., et al., $q#Video Super Resolution Using Duality Based TV-I1 Optical Flow,$q# Joint Pattern Recognition Symposium, 2009, pp. 432-441.
Perez et al., 'Poisson Image Editing,' in ACM Transactions on Graphics (TOG), 2003, vol. 22, No. 3, pp. 313-318.
Schick A., et al., "Improving Foreground Segmentations with Probabilistic Superpixel Markov Random Fields," 2012 IEEE Computer Society Conference on Computer Vision and Pattern Recognition Workshops, 2012, pp. 27-31.
Schwartz, E., et al., "Implementation of Compression with Reversible Embedded Wavelets," In Proc. SPIE, 1995, 12 pages.
Suzuki et al., $q#Inter Frame Coding with Template Matching Averaging,$q# in IEEE international Conference on Image Processing Proceedings (2007), vol. (iII), pp. 409-412.
Szeliski R., "Computer Vision: Algorithms and Applications," Springer Science & Business Media, 2010, 979 pages.
Thaipanich T., et al., "Low Complexity Algorithms for Robust Video frame rate up-conversion (FRUC) technique," IEEE Transactions on Consumer Electronics, Feb. 2009, vol. 55 (1), pp. 220-228.
Ugur et al., "MV-HEVC/SHVC HLS: On default Output Layer Sets", Jan. 2014. 4 pages.
Vass, J., et al., $q#Efficient Three-Dimensional Wavelet Codecs for Networked Video Communication,$q# in Proceedings of IEEE International Conference on Image Processing, Kobe, Japan, Oct. 1999, pp. 565-569.
Won, et al., $q#Size-Controllable Region-of-Interest in Scalable Image Representation$q#, IEEE Transactions on Image Processing, IEEE Service Center, Piscataway, NJ, US, vol. 20, No. 5, May 1, 2011 (May 1, 2011 ), pp. 1273-1280, XPO 11411787, ISSN: 1057-7149, DOI: 10.1109/TIP.2010.2090534.
Xiao, et al., $q#Multiple View Semantic Segmentation for Street View Images,$q# 2009 IEEE 12th International Conference on Computer Vision, 2009, pp. 686-693.
Xiong Y et al., 'Gradient Domain Image Blending and Implementation on Mobile Devices,' International Conference on Mobile Computing, Applications, and Services, Springer Berlin Heidelberg, 2009, pp. 293-306.
Zhai et al., "A Low Complexity Motion Compensated Frame Interpolation Method," in IEEE International Symposium on Circuits and Systems (2005), pp. 4927-4930.
Zhang., "A Flexible New Technique for Camera Calibration" IEEE Transactions, dated Nov. 2000, vol. 22, No. 11, pp. 1330-1334.

* cited by examiner

METHODS AND APPARATUS FOR REAL-TIME GUIDED ENCODING

PRIORITY

This application is a national phase application of and claims the benefit of priority to PCT Patent Application No. PCT/US23/62157 filed Feb. 7, 2023 and entitled "METHODS AND APPARATUS FOR REAL-TIME GUIDED ENCODING", that claims the benefit of priority to U.S. Provisional Patent Application No. 63/267,608 entitled "METHODS AND APPARATUS FOR REAL-TIME GUIDED ENCODING" filed Feb. 7, 2022, the contents of which are incorporated herein by reference in its entirety.

TECHNICAL FIELD

This disclosure relates to encoding video content. Specifically, the present disclosure relates to encoding video content on an embedded device with a real-time budget.

DESCRIPTION OF RELATED TECHNOLOGY

Existing video encoding techniques utilize so-called intra-frames (I-frames), predicted frames (P-frames), and bi-directional frames (B-frames). The 3 different frame types may be used in specific situations to improve video compression efficiency. As described in greater detail herein, most codecs encode video based on image analysis and metrics. Image analysis is computationally complex and often requires look-forward/look-backward comparisons between frames.

An embedded device is a computing device that contains a special-purpose compute system. In many cases, embedded devices must operate within aggressive processing and/or memory constraints to ensure that real-time budgets are met. For example, an action camera (such as the GoPro HERO™ families of devices) must capture each frame of video at the specific rate of capture (e.g., 30 frames per second (fps)). As a practical matter, video compression quality may be significantly limited in embedded devices.

Ideally, improved solutions would enable video coding on embedded devices with real-time budgets.

DETAILED DESCRIPTION

Figure 1:
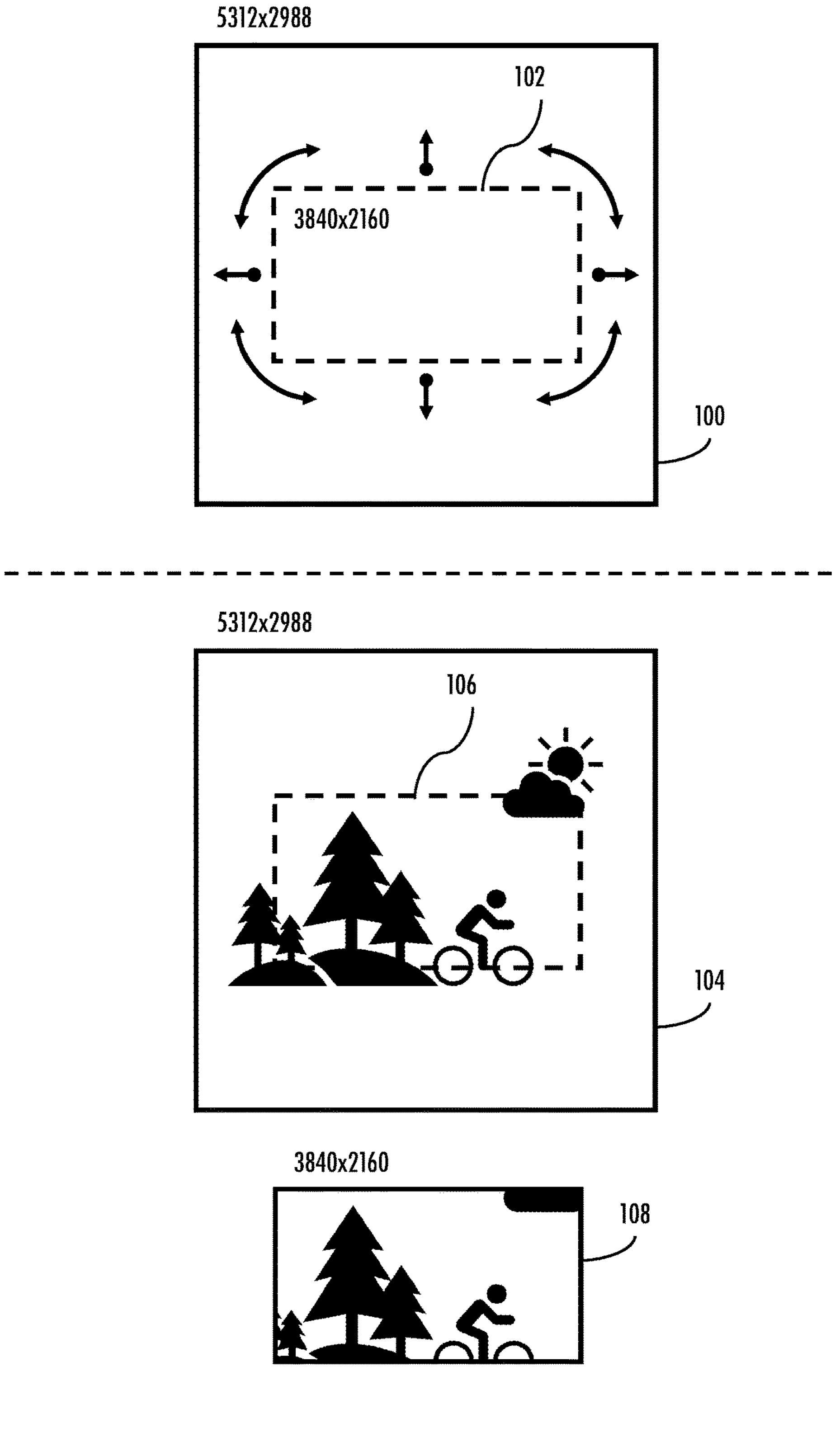
FIG. 1 is a graphical representation of Electronic Image Stabilization (EIS) techniques, useful in explaining various aspects of the present disclosure.

In the following detailed description, reference is made to the accompanying drawings. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion regarding "one embodiment", "an embodiment", "an exemplary embodiment", and the like indicate that the embodiment described may include a particular feature, structure, or characteristic, and that such feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. The described operations may be performed in a different order than the described embodiments. Various additional operations may be performed and/or described operations may be omitted in additional embodiments.

Action Camera Photography and Real-Time Budgets

Unlike most digital photography, action photography is captured under difficult conditions which are often out of the photographer's control. In many cases, shooting occurs in outdoor settings where there are very large differences in lighting (e.g., over-lit, well-lit, shaded, etc.). Additionally, the photographer may not control when/where the subject of interest appears; and taking time to re-shoot may not be an option. Since action cameras are also ruggedized and compact, the user interface (UI/UX) may also be limited. Consider an example of a mountain biker with an action camera mounted to their handlebars, recording a trip through a wilderness canyon. The mountain biker has only very limited ability to control the action camera mid-action. Interesting footage may only be fleeting moments in the periphery of capture. For instance, the mountain biker may not have the time (or ability) to point the camera at a startled deer bolting off trail. Nonetheless, the action camera's wide field-of-view allows the mountain biker to capture subject matter at the periphery of the footage, e.g., in this illustrative example, the footage can be virtually re-framed on the deer, rather than the bike path.

As a related complication, action cameras are often used while in-motion. Notably, the relative motion between the camera's motion and the subject motion can create the perception of apparent motion when the footage is subsequently viewed in a stable frame-of-reference. A variety of different stabilization techniques exist to remove undesirable camera motion. For example, so-called electronic image stabilization (EIS) relies on image manipulation techniques to compensate for camera motion.

As used herein, a "captured view" refers to the total image data that is available for electronic image stabilization (EIS) manipulation. A "designated view" of an image is the visual portion of the image that may be presented on a display and/or used to generate frames of video content. EIS algorithms generate a designated view to create the illusion of stability; the designated view corresponds to a "stabilized" portion of the captured view. In some cases, the designated view may also be referred to as a "cut-out" of the image, a "cropped portion" of the image, or a "punch-out" of the image.

FIG. 1 depicts a large image capture 100 (e.g., 5312×2988 pixels) that may be used to generate a stabilized 4K output video frame 102 (e.g., 3840×2160 pixels) at 120 frames per second (fps). The EIS algorithm may select any contiguous 3840×2160 pixels and may rotate and translate the output video frame 102 within the large image capture 100. For example, a camera may capture all of scene 104 but only use the narrower field of view of scene 106. After in-camera stabilization, the output frame 108 can be grouped with other frames and encoded into video for transport off-camera. Since video codecs compress similar frames of video using motion estimation between frames, stabilized video results in much better compression (e.g., smaller file sizes, less quantization error, etc.).

Notably, the difference between the designated view and the captured field of view defines a "stabilization margin." The designated view may freely pull image data from the stabilization margin. For example, a designated view may be rotated and/or translated with respect to the originally captured view (within the bounds of the stabilization margin). In certain embodiments, the captured view (and likewise the stabilization margin) may change between frames of a video. Digitally zooming (proportionate shrinking or stretching of image content), warping (disproportionate shrinking or stretching of image content), and/or other image content manipulations may also be used to maintain a desired perspective or subject of interest, etc.

As a practical matter, EIS techniques must trade-off between stabilization and wasted data, e.g., the amount of movement that can be stabilized is a function of the amount of cropping that can be performed. Un-stable footage may result in a smaller designated view whereas stable footage may allow for a larger designated view. For example, EIS may determine a size of the designated view (or a maximum viewable size) based on motion estimates and/or predicted trajectories over a capture duration, and then selectively crop the corresponding designated views.

Figure 2:
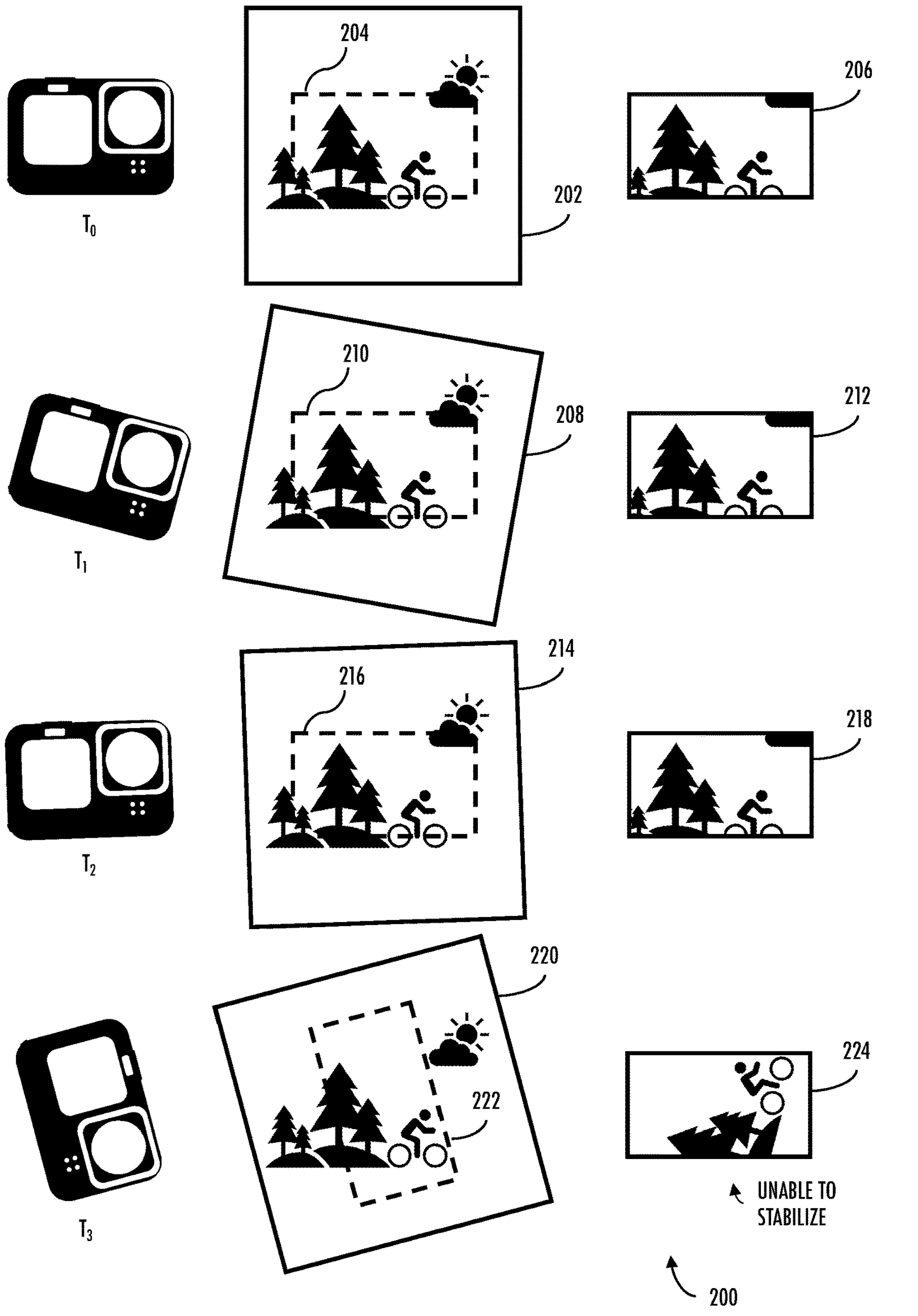
FIG. 2 is a graphical representation of in-camera stabilization and its limitations, useful in explaining various aspects of the present disclosure.

Unfortunately, "in-camera" stabilization is limited by the camera's onboard resources e.g., the real-time budget of the camera, processing bandwidth, memory buffer space, and battery capacity. Additionally, the camera can only predict future camera movement based on previous movement, etc. To illustrate the effects of in-camera stabilization limitations, FIG. 2 depicts one exemplary in-camera stabilization scenario 200.

At time $T_0$, the camera sensor captures frame 202 and the camera selects capture area 204 for creating stabilized video. Frame 206 is output from the capture; the rest of the captured sensor data may be discarded.

At times $T_1$ and $T_2$, the camera shifts position due to camera shake or motion (e.g., motion of the camera operator). The positional shift may be in any direction including movements about a lateral axis, a longitudinal axis, a vertical axis, or a combination of two or more axes. Shifting may also twist or oscillate about one or more of the forgoing axes. Such twisting about the lateral axis is called pitch, about the longitudinal axis is called roll, and about the vertical axis is called yaw.

As before, the camera sensor captures frames 208, 214 and selects capture areas 210, 216 to maintain a smooth transition. Frames 212, 218 are output from the capture; the rest of the captured sensor data may be discarded.

At time $T_3$, the camera captures frame 220. Unfortunately, however, the camera cannot find a suitable stable frame due to the amount of movement and the limited resource budget for real-time execution of in-camera stabilization. The camera selects capture area 222 as a best guess to maintain a smooth transition (or alternatively turns EIS off). Incorrectly stabilized frame 224 is output from the capture and the rest of the captured sensor data may be discarded.

In a related tangent, images captured with sensors that use an Electronic Rolling Shutter (ERS) can also introduce undesirable rolling shutter artifacts where there is significant movement in either the camera or the subject. ERS exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time but they are not erased/read at the same time since the pointers scan through the rows. This slight temporal shift between the start of each row may result in a deformed image if the image capture device (or subject) moves.

ERS compensation may be performed to correct for rolling shutter artifacts from camera motion. In one specific implementation, the capture device determines the changes in orientation of the sensor at the pixel acquisition time to correct the input image deformities associated with the motion of the image capture device. Specifically, the changes in orientation between different captured pixels can be compensated by warping, shifting, shrinking, stretching, etc. the captured pixels to compensate for the camera's motion.

Intra-Frames, Predicted Frames, and Bi-Directional Frames

Video compression is used to encode frames of video at a frame rate for playback. Most compression techniques divide each frame of video into smaller pieces (e.g., blocks, macroblocks, chunks, or similar pixel arrangements). Similar pieces are identified in time and space and compressed into their difference information. Subsequent decoding can recover the original piece and reconstruct the similar pieces using the difference information. For example, in MPEG-based encoding, a frame of video (e.g., 3840×2160 pixels) may be subdivided into macroblocks; each macroblock includes a 16×16 block of luminance information and two 8×8 blocks of chrominance information. For any given macroblock, similar macroblocks are identified in the current, previous, or subsequent frames and encoded relative to the macroblock. Intra-frame similarity refers to macroblocks which are similar within the same frame of video. Inter-frame similarity refers to macroblocks which are similar within different frames of video.

Figure 3:
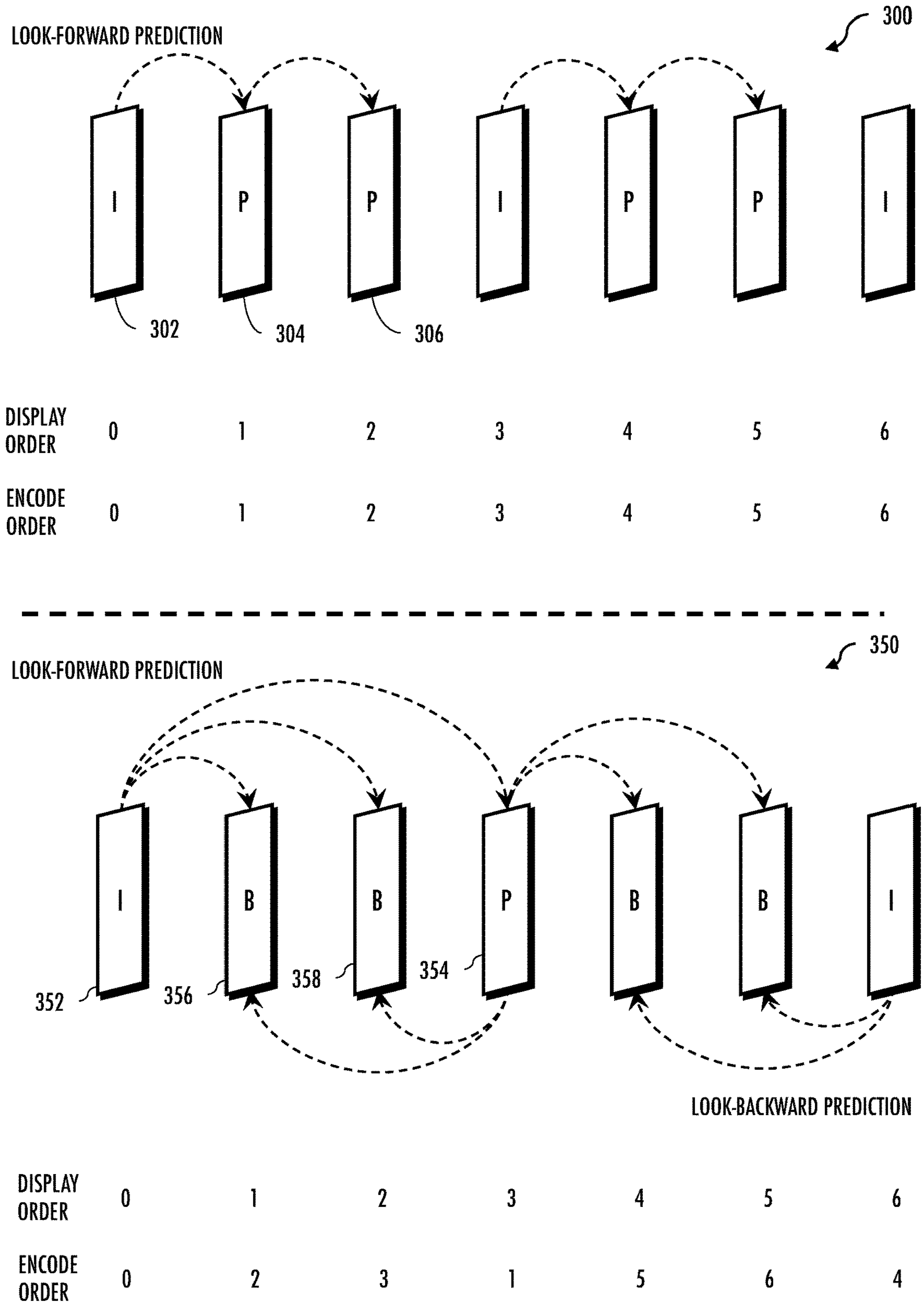
FIG. 3 is a graphical representation of video compression techniques, useful in explaining various aspects of the present disclosure.

FIG. 3 is a graphical representation of video compression techniques, useful in explaining various aspects of the present disclosure. As shown in video compression scheme

300, frames 0-6 of video may be represented with intra-frames (I-frames) and predicted frames (P-frames).

I-frames are compressed with only intra-frame similarity. Every macroblock in an I-frame only refers to other macroblocks within the same frame. In other words, an I-frame can only use "spatial redundancies" in the frame for compression. Spatial redundancy refers to similarities between the pixels of a single frame. An "instantaneous decoder refresh" (IDR) frame is a special type of I-frame that specifies that no frame after the IDR frame can reference any previous frame. During operation, an encoder can send an IDR coded picture to clear the contents of the reference picture buffer. On receiving an IDR coded picture, the decoder marks all pictures in the reference buffer as "unused for reference." In other words, any subsequently transmitted frames can be decoded without reference to frames prior to the IDR frame.

P-frames allow macroblocks to be compressed using temporal prediction in addition to spatial prediction. For motion estimation, P-frames use frames that have been previously encoded e.g., P-frame 304 is a "look-forward" from I-frame 302, and P-frame 306 is a "look-forward" from P-frame 304. Every macroblock in a P-frame can be temporally predicted, spatially predicted, or "skipped" (i.e., the co-located block has a zero-magnitude motion vector). Images often retain much of their pixel information between different frames, so P-frames are generally much smaller than I-frames but can be reconstructed into a full frame of video.

As a brief aside, compression may be lossy or lossless. "Lossy" compression permanently removes data, "lossless" compression preserves the original digital data fidelity. Preserving all the difference information between I-frames to P-frames results in lossless compression, usually however, some amount of difference information can be discarded to improve compression efficiency with very little perceptible impact. Unfortunately, lossy differences (e.g., quantization error) that have accumulated across many consecutive P-frames and/or other data corruptions (e.g., packet loss, etc.) might impact subsequent frames. As a practical matter, I-frames do not reference any other frames and may be inserted to "refresh" the video quality or recover from catastrophic failures. In other words, codecs are typically tuned to favor I-frames in terms of size and quality because they play a critical role in maintaining video quality. Ideally, the frequency of I-frames and P-frames is selected to balance accumulated errors and compression efficiency. For example, in video compression scheme 300, each I-frame is followed by two P-frames. Slower moving video has smaller motion vectors between frames and may use larger numbers of P-frames to improve compression efficiency. Conversely, faster moving video may need more I-frames to minimize accumulated errors.

More complex video compression techniques can use look-forward and look-backward functionality to further improve compression performance. Referring now to video compression scheme 350, frames 0-6 of video may be represented with intra-frames (I-frames), predicted frames (P-frames), and bi-directional frames (B-frames). Much like P-frames, B-frames use temporal similarity for compression-however, B-frames can use backward prediction (a look-backward) to compress similarities for frames that occur in the future, and forward prediction (a look-forward) to compress similarities from frames that occurred in the past. In this case, B-frames 356, 358 each use look-forward information from I-frame 352 and look-backward information from P-frame 354. B-frames can be incredibly efficient for compression (more so than even P-frames).

In addition to compressing redundant information, B-frames also enable interpolation across frames. While P-frames may accumulate quantization errors relative to their associated I-frame, B-frames are anchored between I-frames, P-frames, and in some rare cases, other B-frames (collectively referred to as "anchor frames"). Typically, the quantization error for each B-frame will be less than the quantization error between its anchor frames. For example, in video compression scheme 350, P-frame 354 may have some amount of quantization error from the initial I-frame 352; the B-frames 356, 358 can use interpolation such that their quantization errors are less than the P-frame's error.

As used throughout, a "group of pictures" (GOP) refers to a multiple frame structure composed of a starting I-frame and its subsequent P-frames and B-frames. A GOP may be characterized by its distance between anchor frames (M) and its total frame count (N). In FIG. 3, video compression scheme 300 may be described as M=1, N=3; video compression scheme 350 may be described as M=3, N=7.

Bi-directional coding uses many more resources compared to unidirectional coding. Resource utilization can be demonstrated by comparing display order and encode/decode order. As shown in FIG. 3, video compression scheme 300 is unidirectional because only "look-forward" prediction is used to generate P-frames. In this scenario, every frame will either refer to itself (I-frame) or to a previous frame (P-frame). Thus, the frames can enter and exit the encoder/decoder in the same order. In contrast, video compression scheme 350 is bi-directional and must store a large buffer of frames. For example, the encoder must store and re-order I-frame 352 before P-frame 354; both B-frame 356 and B-frame 358 will each separately refer to I-frame 352 and P-frame 354. While this example depicts encoding, analogous re-ordering must occur at the decoder. In other words, the codecs must maintain two separate "orders" or "queues" in their memory-one queue for display, and another queue for encoding/decoding. Due to the re-ordering requirements, bi-directional coding greatly affects the memory usage and latency of codecs.

While the present discussion is described in the context of "frames", artisans of ordinary skill in the related arts will readily appreciate that the techniques described throughout may be generalized to any spatial and/or temporal subdivision of media data. For example, the H.264/MPEG-4 AVC video coding standard (Advanced Video Coding for Generic Audiovisual Services, published August 2021, and incorporated herein by reference in its entirety), provides prediction within "slices" of a frame. A slice is a spatially distinct region of a frame that is encoded separately from other regions of the same frame. I-slices only use macroblocks with intra-prediction, P-slices can use macroblocks with intra- or inter-prediction. So-called "switching P-slices" (SP-slices) are similar to P-slices and "switching I-slices" (SI-slices) are similar to I-slices, however corrupted SP-slices can be replaced with SI-slices—this enables random access and error recovery functionality at slice granularity. Notably, IDR frames can only contain I-slices or SI-slices.

Real-Time Guidance for Encoding

Various embodiments of the present disclosure use real-time information to "guide" in-camera video encoding. In one exemplary embodiment, an image processing pipeline (IPP) is implemented within a system-on-a-chip (SoC) that includes multiple stages, ending with a codec. The codec compresses video obtained from the previous stages into a bitstream for storage within removable media (e.g., an SD card), or transport (over e.g., Wi-Fi, Ethernet, or similar network). As discussed throughout, the quality of encoding is a function of the allocated bit rate for each frame of the video. While most hardware implementations of real-time encoding allocate bit rate based on a limited look-forward (or look-backward) of the data in the current pipeline stage, the exemplary IPP leverages real-time guidance that was collected during the previous stages of the pipeline.

In one specific implementation, the image processing pipeline (IPP) of an action camera uses information from capture and in-camera pre-processing stages to dynamically configure the codec's encoding parameters. For example, the real-time guidance may select quantization parameters, compression, bit rate settings, and/or group of picture (GOP) sizes for the codec, during and (in some variants) throughout a live capture. In at least one such variant, the real-time guidance works within existing codec API frameworks such that off-the-shelf commodity codecs can be used. While the exemplary embodiment is discussed in the context of pipelined hardware, the discussed techniques could be used with virtualized codecs (software emulation) with similar success.

Notably, some real-time capture information may be gathered and processed more efficiently than image analysis-based counterparts. For example, onboard sensors (e.g., accelerometers, gyroscopes, magnetometers, etc.) can directly measure physical motion of the device as a whole; in contrast, motion vector analysis determines motion information for each pixel. While pixel-granularity motion vectors are much more accurate, this level of detail is unnecessary for configuring the codec pipeline's operation (e.g., quantization parameters, compression, bit rate settings, and/or group of picture (GOP) sizes, etc.)—the physical motion sensed by the device can provide acceptable guidance. Similarly, onboard image signal processor (ISP) color corrections calculate statistics that are similar to color palette analysis used during e.g., facial detection, scene classification and/or region-of-interest (ROI) selection. While ISP statistics are not described at pixel-granularity, nonetheless they can still be used to configure the codec pipeline. Most encoding parameters for codec operation are only a few words (e.g., 32-bit, 64-bit, 128-bit, etc.) and do not require or convey pixel-granular accuracy.

As a related benefit, the exemplary IPP can enable performance and quality similar to bi-directional encoding, using only unidirectional encoding techniques. Conceptually, bi-directional encoding techniques search for opportunities to leverage spatial and temporal redundancy. In many cases, bi-directional encoding can arrange frames in complex orderings to maximize compression performance. Unfortunately, re-ordering frames on-the-fly requires many more processor-memory accesses (e.g., double data rate (DDR) bandwidth, etc.) and significantly increases power consumption; this may reduce battery life and/or break real-time budgets of embedded devices. In contrast, each stage of the exemplary IPP performs its processing tasks in series; in other words, the output of a stage (the upstream stage) is input to the next stage (the downstream stage). The real-time guidance from earlier stages of processing provides a much larger range of information than is available to the codec. For example, an IPP with a pipeline latency of 1 second can provide real-time guidance anytime within that range—in other words, the codec's encoding parameters can be re-configured based on 1 second of advance notice (e.g., real-time guidance that is a look-backward from image data that has not yet entered the encoder).

Figure 4:
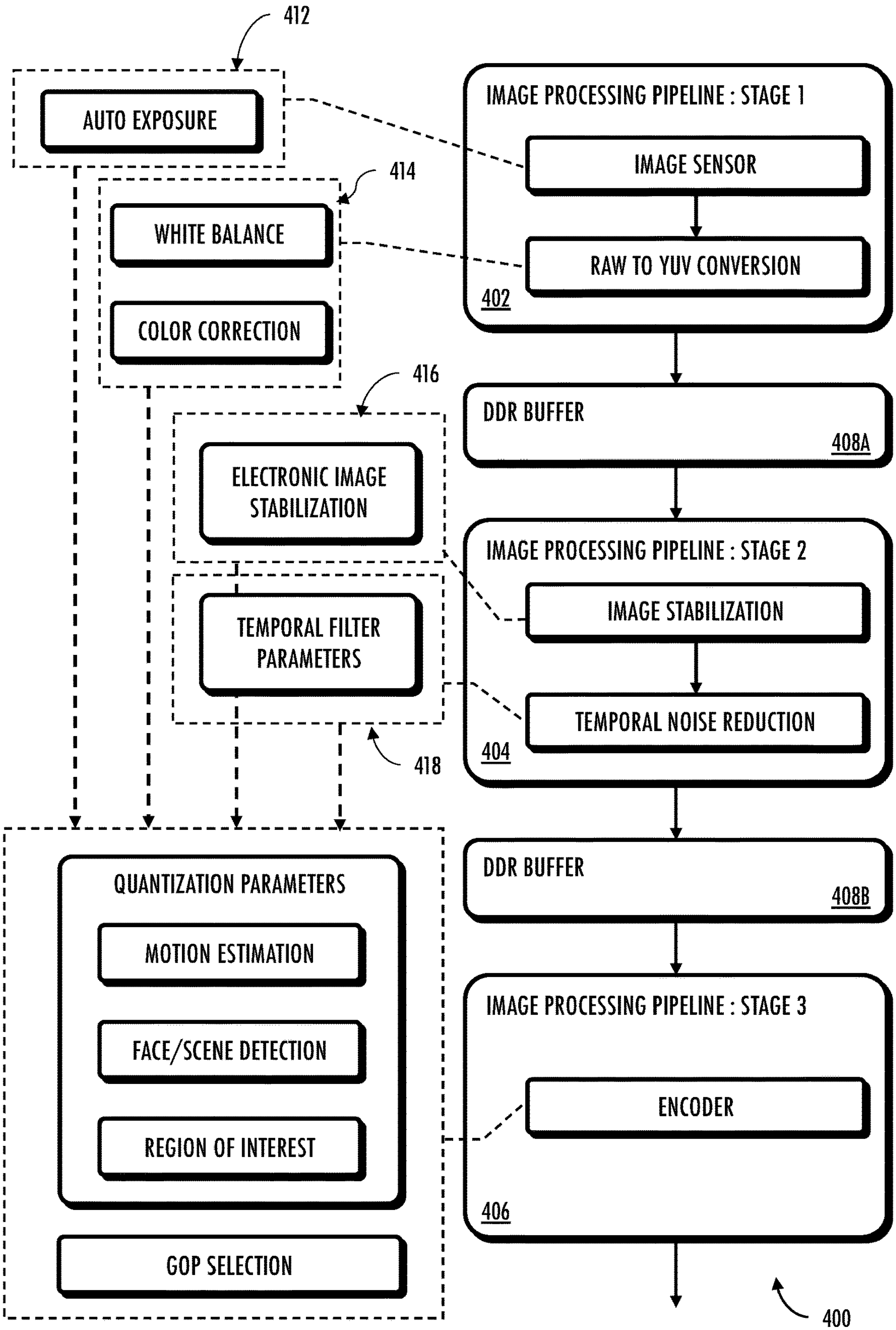
FIG. 4 is a graphical representation of real-time encoding guidance, useful in explaining various aspects of the present disclosure.

FIG. 4 is a logical flow diagram of the exemplary image processing pipeline (IPP) 400, useful to illustrate various aspects of the present disclosure. As shown, the exemplary IPP has three (3) stages: a first stage 402 that captures raw data and converts the raw data to a color space (e.g., YUV), a second stage 404 that performs in-camera pre-processing, and a third stage 406 for encoding video. Transitions between stages of the pipeline are facilitated by DDR buffers 408A, 408B.

In one exemplary embodiment, the first stage 402 is implemented within an image signal processor (ISP). As shown, the ISP controls the light capture of a camera sensor and may also perform color space conversion. The camera captures light information by "exposing" its photoelectric sensors for a short period of time. The "exposure" may be characterized by three parameters: aperture, ISO (sensor gain) and shutter speed (exposure time). Exposure determines how light or dark an image will appear when it's been captured by the camera. During normal operation, a digital camera may automatically adjust aperture, ISO, and shutter speed to control the amount of light that is received; this functionality is commonly referred to as "auto exposure" (shown as auto exposure logic 412). Most action cameras are fixed aperture cameras due to form factor limitations and their most common use cases (varied lighting conditions)—fixed aperture cameras only adjust ISO and shutter speed.

After each exposure, the ISP reads raw luminance data from the photoelectric camera sensor; the luminance data is associated with locations of a color filter array (CFA) to create a "mosaic" of chrominance values. The ISP demosaics the luminance and chrominance data to generate a standard color space for the image; for example, in the illustrated embodiment, the raw data is converted to the YUV (or YCrCb) color space.

The ISP performs white balance and color correction 414 to compensate for lighting differences. White balance attempts to mimic the human perception of "white" under different light conditions. As a brief aside, a camera captures chrominance information differently than the eye does. The human visual system perceives light with three different types of "cone" cells with peaks of spectral sensitivity at short ("blue", 420 nm-440 nm), middle ("green", 530 nm-540 nm), and long ("red", 560 nm-580 nm) wavelengths. Human sensitivity to red, blue, and green change over different lighting conditions; in low light conditions, the human eye has reduced sensitivity to red light but retains blue/green sensitivity, in bright conditions, the human eye has full color vision. Without proper white balance, environmental color temperatures will look unnatural. For instance, an image shot in a fluorescent room will look "greenish", indoor tungsten light will look "yellowish", and shadows may be "bluish". White balance can correct the "white point", however additional color correction may be necessary to balance the rest of the color spectrum. Color correction may mimic natural lighting, or add artistic effects (e.g., to make blues and oranges "pop", etc.).

After color space conversion, the output images of the first stage 402 of the IPP may be written to the DDR buffer 408A. In one specific implementation, the DDR buffer 408A may be a first-in-first-out (FIFO) buffer of sufficient size for the maximum IPP throughput; e.g., a 5.3K (15.8 MegaPixels) of 10-bit image data at 60 frames per second (fps) with a 1 second buffer would need ~10 Gbit (or 1.2 GByte) of working memory. In some cases, the memory buffer may be allocated from a system memory; for example, a 10 Gbit region from a 32 Gbit DRAM may be used to provide the DDR buffer 408A. In the illustrated embodiment, the memory buffers can be accessed with double-data rate (DDR) for peak data rates, but should use single data rate (SDR), when possible, to minimize power consumption and improve battery life. While the illustrated embodiment depicts two memory buffers for clarity, any number of physical memory buffers may be virtually subdivided or combined for use with equal success.

In one exemplary embodiment, auto exposure and color space conversion statistics may be written as metadata associated with the output images. As but one such example, auto exposure settings (ISO, and shutter speed) for each image may be stored within a metadata track. Similarly, white balance and color correction adjustments may be stored within the metadata track. In some cases, additional statistics may be provided—for example, color correction may indicate "signature" spectrums (e.g., flesh tones for face detection, spectral distributions associated with common sceneries (foliage, snow, water, cement), and/or specific regions of interest. In fact, some ISPs explicitly provide e.g., facial detection, scene classification, and/or region-of-interest (ROI) detection.

Artisans of ordinary skill in the related art will readily appreciate that the first stage 402 of the IPP may include other functionality, the foregoing being purely illustrative. As but one example, some ISPs may additionally spatially denoise each image before writing to DDR buffer 408A. As used herein, "spatial denoising" refers to noise reduction techniques that are applied to regions of an image. Spatial denoising generally corrects chrominance noise (color fluctuations) and luminance noise (light/dark fluctuations). Other examples of ISP functionality may include, without limitation, autofocus, image sharpening, contrast enhancement, and any other sensor management/image enhancement techniques.

In one exemplary embodiment, the second stage 404 is implemented within a central processing unit (CPU) and/or graphics processing unit (GPU). The second stage 404 retrieves groups of images from the DDR buffer 408A and incorporates sensor data to perform image stabilization and other temporal denoising. As used herein, "temporal denoising" refers to noise reduction techniques that are applied across multiple images.

In one specific embodiment, temporal denoising techniques 418 smooth differences in pixel movements between successive images. This technique may be parameterized according to a temporal filter radius and a temporal filter threshold. The temporal filter radius determines the number of consecutive frames used for temporal filtration. Higher values of this setting lead to more aggressive (and slower) temporal filtration, whereas lower values lead to less aggressive (and faster) filtration. The temporal filter threshold setting determines how sensitive the filter is to pixel changes in consecutive frames. Higher values of this setting lead to more aggressive filtration with less attention to temporal changes (lower motion sensitivity). Lower values lead to less aggressive filtration with more attention to temporal changes and better preservation of moving details (higher motion sensitivity). Temporal denoising may include calculations of pixel motion vectors between images for smoothing; these calculations are similar in effect to the motion vector calculations performed by the codec and may predict subsequent codec workload.

Image stabilization and electronic rolling shutter (ERS) compensation were discussed in greater detail above (see e.g., Action Camera Photography and Real-Time Budgets above). Electronic image stabilization (EIS) algorithms 416 may use in-camera sensor data to calculate image orientation (IORI) and camera orientation (CORI). The IORI and CORI may be provided for each image within the group of images. As but one such example, the IORI quaternion may define an orientation relative to CORI quaternion-IORI represents the image orientation that counteracts (smooths) the camera's physical movement.

As a brief aside, IORI and CORI may be represented in a variety of different data structures (e.g., quaternions, Euler angles, etc.). Euler angles are the angles of orientation or rotation of a three-dimensional coordinate frame. In contrast, quaternions are a four-dimensional vector generally represented in the form a+bi+cj+dk where: a, b, c, d are real numbers; and i, j, k are the basic quaternions that satisfy $i^2=j^2=k^2=ijk=-1$. Points on the unit quaternion can represent (or "map") all orientations or rotations in three-dimensional space. Therefore, Euler angles and quaternions may be converted to one another. Quaternion calculations can be more efficiently implemented in software to perform rotation and translation operations on image data (compared to analogous operations with Euler angles); thus, quaternions are often used to perform EIS manipulations (e.g., pan and tilt using matrix operations). Additionally, the additional dimensionality of quaternions can prevent/correct certain types of errors/degenerate rotations (e.g., gimble lock). While discussed with reference to quaternions, artisans of ordinary skill in the related art will readily appreciate that the orientation may be expressed in a variety of systems.

Referring back to FIG. 4, certain images may be explicitly flagged for subsequent quantization, compression, bit rate adjustment, and/or group of picture (GOP) sizing. Notably, the IORI should mirror, or otherwise counteract, CORI within a threshold tolerance. Significant deviations in IORI, relative to CORI, may indicate problematic frames; similarly small alignment deviations may indicate good frames. Flagged "worst case" frames may be good candidates for I-frames since I-frames provide the most robust quality. Similarly, "best case" frames may include frames which exhibit little/no physical movement. These frames may be good candidates for P-frames (or even B-frames if the real-time budget permits). Providing flagged frames to the codec may greatly reduce encoding time compared to brute force pixel-searching techniques. In other words, rather than using a static GOP size, compression, quantization, and/or bit rates that may be overly conservative (or dynamic image analysis which is computationally expensive), the codec can dynamically set quantization, compression, bit rate adjustment, and/or group of picture (GOP) sizing based on sensor data.

Other variants may additionally parameterize frame types within the GOP. For example, parameterization may define a distance between anchor frames (M) in addition to a total frame count (N). Other implementations may control the number of B-frames and P-frames in a GOP, a number of P-frames between I-frames, a number of B-frames between P-frames, and/or any other framing constraint. Additionally, some encoders may also incorporate search block sizing (in addition to frame indexing) as a parameter to search for motion. Larger blocks result in slower, but potentially more robust, encoding; conversely, smaller search blocks can be faster but may be prone to errors.

After stabilization and temporal denoising, the output images of the second stage 404 of the IPP may be written to the DDR buffer 408B. In one specific implementation, the DDR buffer 408B may be a first-in-first-out (FIFO) buffer of sufficient size for the maximum IPP throughput; thus, DDR buffer 408B should be sized commensurate to DDR buffer 408A. Much like DDR buffer 408A, the illustrated memory buffers are capable of peak DDR operation, but preferably should remain SDR where possible.

Artisans of ordinary skill in the related art will readily appreciate that the second stage 404 of the IPP may include other functionality, the foregoing being purely illustrative. As but one example, 360° action cameras may additionally warp and/or stitch multiple images together to provide 360° panoramic video. Other examples of CPU/GPU functionality may include, without limitation, tasks of arbitrary/best effort complexity and/or highly-parallelized processing. Such tasks may include user applications provided by e.g., firmware patched upgrades and/or external 3$^{rd}$ party vendor software.

In one exemplary embodiment, the third stage 406 is implemented within a codec that is configured via application programming interface (API) calls from the CPU. Codec operation may be succinctly condensed into the following steps: opening an encoding session, determining encoder attributes, determining an encoding configuration, initializing the hardware pipeline, allocating input/output (I/O) resources, encoding one or more frames of video, writing the output bitstream, and closing the encoding session. In slightly more detail, an encoding session is "opened" via an API call to the codec (physical hardware or virtualized software). The API allows the codec to determine its attributes (e.g., encoder globally unique identifier (GUID), profile GUID, and hardware supported capabilities) and its encoding configuration. In one exemplary implementation, the encoding configuration is based on real-time guidance (e.g., quantization, compression, bit rate adjustment, and/or group of picture (GOP) sizing may be based on parameters provided from upstream IPP operations). Thereafter, the codec can initialize its parameters based on its attributes and encoding configuration and allocate the appropriate I/O resources—at this point, the codec is ready to encode data. Subsequent codec operation retrieves input frames, encodes the frames into an output bitstream, and writes the output bitstream to a data structure for storage/transfer. After the encoding has terminated, the encoding session can be "closed" to return codec resources back to the system.

In one exemplary embodiment, real-time guidance can update and/or correct the encoding configuration during and (in some variants) throughout a live capture. Specifically, the third stage 406 of the IPP can use capture and conversion statistics (from the first stage 402) and sensed motion data (from the second stage 404) to configure the encoding parameters prior to processing. For instance, the CPU may determine quantization parameters based on auto exposure and color space conversion statistics for the output images discussed above. In some cases, quantization parameters may be based on pixel motion vectors obtained from the temporal denoising discussed above. Where available, facial recognition, scene classification, and/or region-of-interest (ROI) metadata may also be used. Additionally, flagged images and/or IORI/CORI information may be used to determine GOP sizing. Similar adjustments may be made to compression and bit rate adjustments. Advantageously, the real-time guidance information from previous stages may be retrieved in advance of encoding—this is a function of the IPP's pipelining. More directly, instead of buffering 1 second of images within the codec so that the codec can perform look-forward/look-behind prediction, the CPU can configure the codec's encoding parameters based on 1 second of real-time guidance provided by earlier stages of the IPP.

A comprehensive listing of various encoding parameters and API calls may be found at the following links (last retrieved Feb. 3, 2022), incorporated herein by reference in their entireties:

https://ffmpeg.org/doxygen/3.3/group_ENCODER_STRUCTURE.html;

https://ffmpeg.org/doxygen/3.3/structNV_ENC_PIC_PARAMS.html; and https://ffmpeg.org/doxygen/3.3/structNV_ENC_CONFIG.html.

Technological Improvements and Other Considerations

The above-described system and method solves a technological problem in industry practice related to real-time video encoding on-the-fly. Conventional video encoding techniques are optimized for content delivery networks which encode-once-deliver-often. As a practical matter, conventional encoders have an unconstrained ability to look-forward or look-backward in the video to maximize compression and video quality. In many cases, such encoders improve compression performance by increasing the search space-both in the number of frames held in memory as well as in-frame pixel searches for motion estimation. These techniques are often performed at "best-effort" with unconstrained processing power and memory. Action photography often must capture footage in real-time as it occurs. Additionally, the form factor requirements for action cameras can impose aggressive embedded constraints (processing power, memory space). More directly, the technique described above overcomes a problem that was introduced by, and rooted in, the unconventional nature of action photography.

As a related noted, conventional video encoding assumes a division of tasks between specialized devices. For example, studio-quality footage is typically captured with specialized cameras, and encoding is optimized for compute intensive environments such as server farms and cloud computing, etc. An embedded device creates opportunities for efficiencies that are not otherwise available in distinct devices. For example, the action camera may have a shared memory between various processing units that allows in-place data processing, rather than moving data across a data bus between processing units. As one specific optimization, the in-camera stabilization output may be read in-place from a circular buffer (before being overwritten) and used as input for initial motion vector estimates of the encoder. More directly, the techniques described throughout enable specific improvements to the operation of a computer, particularly those of a mobile/embedded nature.

Furthermore, the various techniques described throughout leverage supplemental data to improve real-time encoding of a primary data stream. As but one such example, image stabilization and image signal processing (ISP) data (color correction metrics, etc.) are supplemental data and are not widely available on generic camera or computing apparatus. Furthermore, conventional encoded media also does not include supplemental data since they are not displayed during normal replay. Thus, the improvements described throughout are tied to specific components that play a significant role in real-time encoding.

System Architecture

Figure 5:
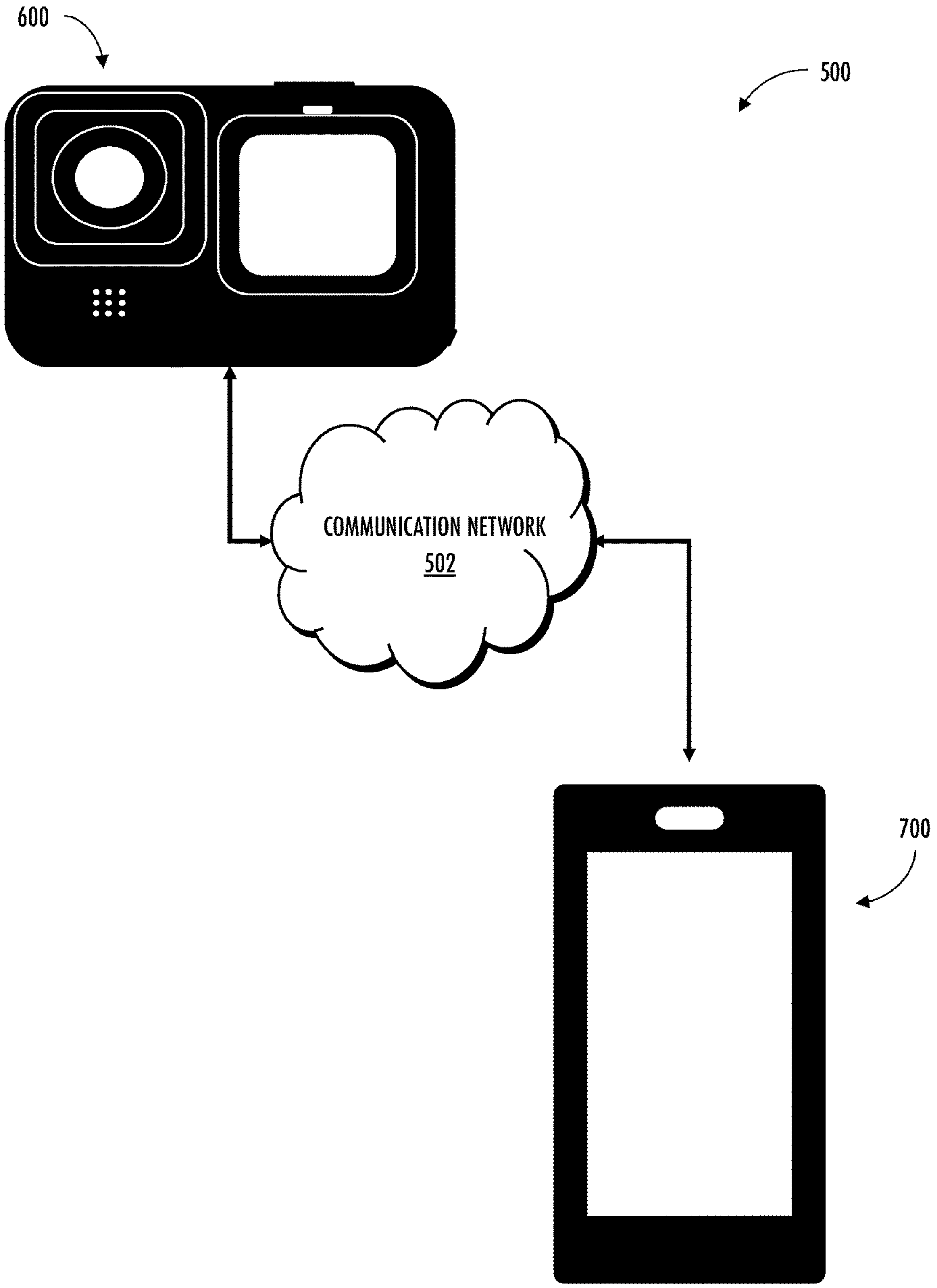
FIG. 5 is a logical block diagram of the exemplary system that includes: an encoding device, a decoding device, and a communication network, in accordance with various aspects of the present disclosure.

FIG. 5 is a logical block diagram of the exemplary system 500 that includes: an encoding device 600, a decoding device 700, and a communication network 502. The encoding device 600 may capture data and encode the captured data in real-time (or near real-time) for transfer to the decoding device 700 directly or via communication network 502. In some cases, the video may be live streamed over the communication network 502.

While the following discussion is presented in the context of an encoding device 600 and a decoding device 700, artisans of ordinary skill in the related arts will readily appreciate that the techniques may be broadly extended to other topologies and/or systems. For example, the encoding device may transfer a first-pass encoded video to another device for a second-pass of encoding (e.g., with larger look-forward, look-backward buffers, and best-effort scheduling). As another example, a device may capture media and real-time information for another device to encode.

The following discussion provides functional descriptions for each of the logical entities of the exemplary system **50*o*. Artisans of ordinary skill in the related art will readily appreciate that other logical entities that do the same work in substantially the same way to accomplish the same result are equivalent and may be freely interchanged. A specific discussion of the structural implementations, internal operations, design considerations, and/or alternatives, for each of the logical entities of the exemplary system 500** is separately provided below.

Functional Overview of the Encoding Device

Functionally, an encoding device 600 captures images and encodes the images as video. In one aspect, the encoding device 600 collects and/or generates supplemental data to guide encoding. In another aspect, the encoding device 600 performs real-time (or near real-time) encoding within a fixed set of resources. In yet another aspect, the processing units of the encoding device 600 may share resources.

The techniques described throughout may be broadly applicable to encoding devices such as cameras including action cameras, digital cameras, digital video cameras; cellular phones; laptops; smart watches; and/or IoT devices. For example, a smart phone or laptop may be able to capture and process video. Various other applications may be substitute with equal success by artisans of ordinary skill, given the contents of the present disclosure.

Figure 6:
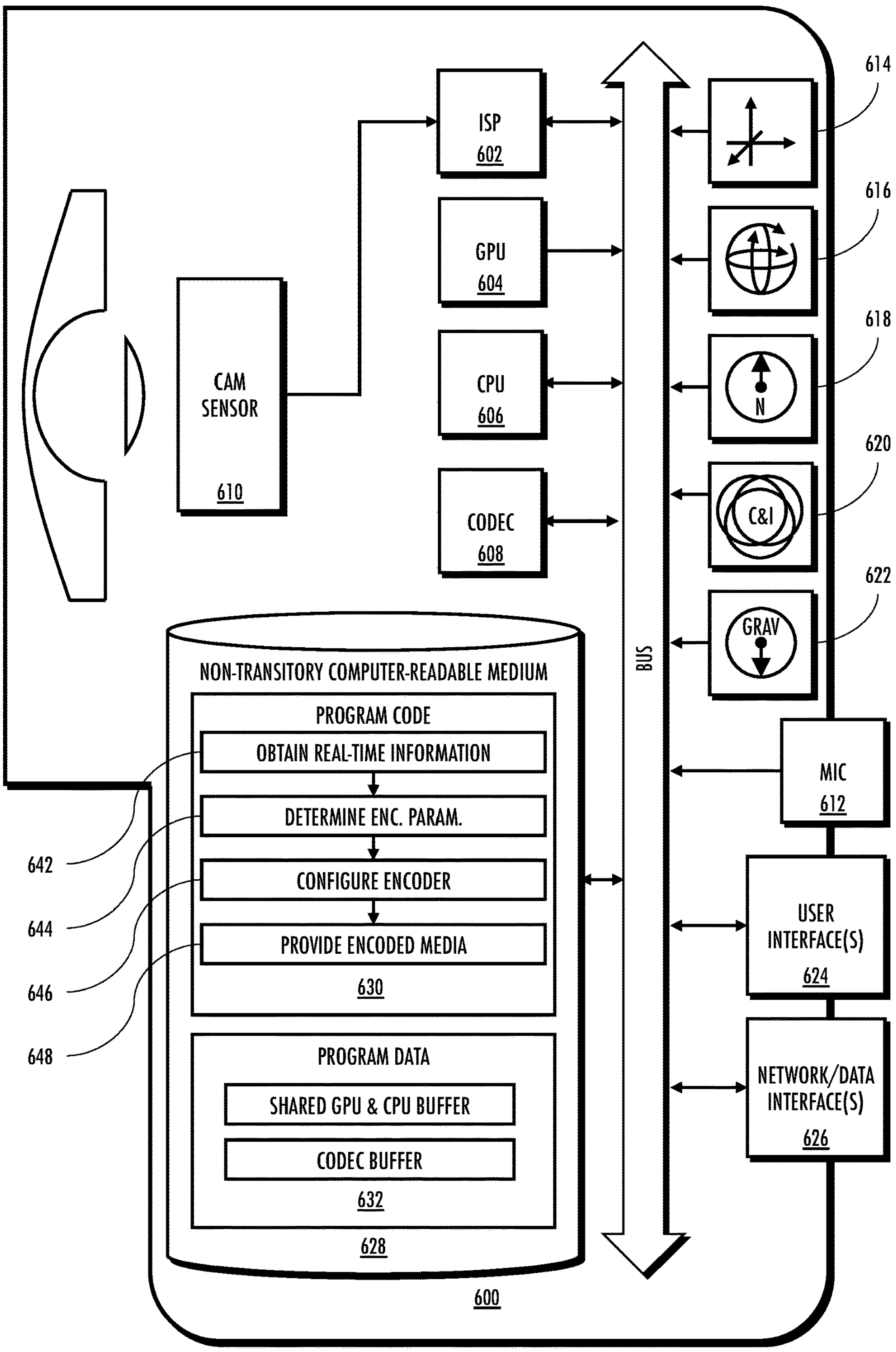
FIG. 6 is a logical block diagram of an exemplary encoding device, in accordance with various aspects of the present disclosure.

FIG. 6 is a logical block diagram of an exemplary encoding device 600. The encoding device 600 includes: a sensor subsystem, a user interface subsystem, a communication subsystem, a control and data subsystem, and a bus to enable data transfer. The following discussion provides a specific discussion of the internal operations, design considerations, and/or alternatives, for each subsystem of the exemplary encoding device 600.

As used herein, the term "real-time" refers to tasks that must be performed within definitive constraints; for example, a video camera must capture each frame of video at a specific rate of capture (e.g., 30 frames per second (fps)). As used herein, the term "near real-time" refers to tasks that must be performed within definitive time constraints once started; for example, a smart phone may use near real-time rendering for each frame of video at its specific rate of display, however some queueing time may be allotted prior to display.

Unlike real-time tasks, so-called "best-effort" refers to tasks that can be handled with variable bit rates and/or latency. Best-effort tasks are generally not time sensitive and can be run as low-priority background tasks (for even very high complexity tasks), or queued for cloud-based processing, etc.

Functional Overview of the Sensor Subsystem

Functionally, the sensor subsystem senses the physical environment and captures and/or records the sensed environment as data. In some embodiments, the sensor data may be stored as a function of capture time (so-called "tracks"). Tracks may be synchronous (aligned) or asynchronous (non-aligned) to one another. In some embodiments, the sensor data may be compressed, encoded, and/or encrypted as a data structure (e.g., MPEG, WAV, etc.)

The illustrated sensor subsystem includes: a camera sensor **61*o*, a microphone 612, an accelerometer (ACCL 614), a gyroscope (GYRO 616), and a magnetometer (MAGN 618**).

Other sensor subsystem implementations may multiply, combine, further sub-divide, augment, and/or subsume the foregoing functionalities within these or other subsystems. For example, two or more cameras may be used to capture panoramic (e.g., wide or 360°) or stereoscopic content. Similarly, two or more microphones may be used to record stereo sound.

In some embodiments, the sensor subsystem is an integral part of the encoding device 600. In other embodiments, the sensor subsystem may be augmented by external devices and/or removably attached components (e.g., hot-shoe/cold-shoe attachments, etc.). The following sections provide detailed descriptions of the individual components of the sensor subsystem.

Camera Implementations and Design Considerations

In one exemplary embodiment, a camera lens bends (distorts) light to focus on the camera sensor **61*o***. In one specific implementation, the optical nature of the camera lens is mathematically described with a lens polynomial. More generally however, any characterization of the camera lens' optical properties may be substituted with equal success; such characterizations may include without limitation: polynomial, trigonometric, logarithmic, look-up-table, and/or piecewise or hybridized functions thereof. In one variant, the camera lens provides a wide field-of-view greater than 90°; examples of such lenses may include e.g., panoramic lenses 120° and/or hyper-hemispherical lenses 180°.

In one specific implementation, the camera sensor 610 senses light (luminance) via photoelectric sensors (e.g., CMOS sensors). A color filter array (CFA) value provides a color (chrominance) that is associated with each sensor. The combination of each luminance and chrominance value provides a mosaic of discrete red, green, blue value/positions, that may be "demosaiced" to recover a numeric tuple (RGB, CMYK, YUV, YCrCb, etc.) for each pixel of an image.

More generally however, the various techniques described herein may be broadly applied to any camera assembly; including e.g., narrow field-of-view (30° to 90°) and/or stitched variants (e.g., 360° panoramas). While the foregoing techniques are described in the context of perceptible light, the techniques may be applied to other electromagnetic (EM) radiation capture and focus apparatus including without limitation: infrared, ultraviolet, and/or X-ray, etc.

As a brief aside, "exposure" is based on three parameters: aperture, ISO (sensor gain) and shutter speed (exposure time). Exposure determines how light or dark an image will appear when it's been captured by the camera(s). During normal operation, a digital camera may automatically adjust one or more settings including aperture, ISO, and shutter speed to control the amount of light that is received. Most action cameras are fixed aperture cameras due to form factor limitations and their most common use cases (varied lighting conditions)—fixed aperture cameras only adjust ISO and shutter speed. Traditional digital photography allows a user to set fixed values and/or ranges to achieve desirable aesthetic effects (e.g., shot placement, blur, depth of field, noise, etc.).

The term "shutter speed" refers to the amount of time that light is captured. Historically, a mechanical "shutter" was used to expose film to light; the term shutter is still used, even in digital cameras that lack of such mechanisms. For example, some digital cameras use an electronic rolling shutter (ERS) that exposes rows of pixels to light at slightly different times during the image capture. Specifically, CMOS image sensors use two pointers to clear and write to each pixel value. An erase pointer discharges the photosensitive cell (or rows/columns/arrays of cells) of the sensor to erase it; a readout pointer then follows the erase pointer to read the contents of the photosensitive cell/pixel. The capture time is the time delay in between the erase and readout pointers. Each photosensitive cell/pixel accumulates the light for the same exposure time, but they are not erased/read at the same time since the pointers scan through the rows. A faster shutter speed has a shorter capture time, a slower shutter speed has a longer capture time.

A related term, "shutter angle" describes the shutter speed relative to the frame rate of a video. A shutter angle of 360° means all the motion from one video frame to the next is captured, e.g., video with 24 frames per second (fps) using a 360° shutter angle will expose the photosensitive sensor for $1/24^{th}$ of a second. Similarly, 120 fps using a 360° shutter angle exposes the photosensitive sensor 1/120th of a second. In low light, the camera will typically expose longer, increasing the shutter angle, resulting in more motion blur. Larger shutter angles result in softer and more fluid motion, since the end of blur in one frame extends closer to the start of blur in the next frame. Smaller shutter angles appear stuttered and disjointed since the blur gap increases between the discrete frames of the video. In some cases, smaller shutter angles may be desirable for capturing crisp details in each frame. For example, the most common setting for cinema has been a shutter angle near 180°, which equates to a shutter speed near $1/48^{th}$ of a second at 24 fps. Some users may use other shutter angles that mimic old 1950's newsreels (shorter than 180°).

In some embodiments, the camera resolution directly corresponds to light information. In other words, the Bayer sensor may match one pixel to a color and light intensity (each pixel corresponds to a photosite). However, in some embodiments, the camera resolution does not directly correspond to light information. Some high-resolution cameras use an N-Bayer sensor that groups four, or even nine, pixels per photosite. During image signal processing, color information is re-distributed across the pixels with a technique called "pixel binning". Pixel-binning provides better results and versatility than just interpolation/upscaling. For example, a camera can capture high resolution images (e.g., 108 MPixels) in full-light; but in low-light conditions, the camera can emulate a much larger photosite with the same sensor (e.g., grouping pixels in sets of 9 to get a 12 MPixel "nona-binned" resolution). Unfortunately, cramming photosites together can result in "leaks" of light between adjacent pixels (i.e., sensor noise). In other words, smaller sensors and small photosites increase noise and decrease dynamic range.

Microphone Implementations and Design Considerations

In one specific implementation, the microphone 612 senses acoustic vibrations and converts the vibrations to an electrical signal (via a transducer, condenser, etc.). The electrical signal may be further transformed to frequency domain information. The electrical signal is provided to the audio codec, which samples the electrical signal and converts the time domain waveform to its frequency domain representation. Typically, additional filtering and noise reduction may be performed to compensate for microphone characteristics. The resulting audio waveform may be compressed for delivery via any number of audio data formats.

Commodity audio codecs generally fall into speech codecs and full spectrum codecs. Full spectrum codecs use the modified discrete cosine transform (mDCT) and/or mel-frequency cepstral coefficients (MFCC) to represent the full audible spectrum. Speech codecs reduce coding complexity by leveraging the characteristics of the human auditory/speech system to mimic voice communications. Speech codecs often make significant trade-offs to preserve intelligibility, pleasantness, and/or data transmission considerations (robustness, latency, bandwidth, etc.).

More generally however, the various techniques described herein may be broadly applied to any integrated or handheld microphone or set of microphones including, e.g., boom and/or shotgun-style microphones. While the foregoing techniques are described in the context of a single microphone, multiple microphones may be used to collect stereo sound and/or enable audio processing. For example, any number of individual microphones can be used to constructively and/or destructively combine acoustic waves (also referred to as beamforming).

IMU Implementations and Design Considerations

The inertial measurement unit (IMU) includes one or more accelerometers, gyroscopes, and/or magnetometers. In one specific implementation, the accelerometer (ACCL 614) measures acceleration and gyroscope (GYRO 616) measure rotation in one or more dimensions. These measurements may be mathematically converted into a four-dimensional (4D) quaternion to describe the device motion, and electronic image stabilization (EIS) may be used to offset image orientation to counteract device motion (e.g., CORI/IORI 620). In one specific implementation, the magnetometer (MAGN 618) may provide a magnetic north vector (which may be used to "north lock" video and/or augment location services such as GPS), similarly the accelerometer (ACCL 614) may also be used to calculate a gravity vector (GRAV 622).

Typically, an accelerometer uses a damped mass and spring assembly to measure proper acceleration (i.e., acceleration in its own instantaneous rest frame). In many cases, accelerometers may have a variable frequency response. Most gyroscopes use a rotating mass to measure angular velocity; a MEMS (microelectromechanical) gyroscope may use a pendulum mass to achieve a similar effect by measuring the pendulum's perturbations. Most magnetometers use a ferromagnetic element to measure the vector and strength of a magnetic field; other magnetometers may rely on induced currents and/or pickup coils. The IMU uses the acceleration, angular velocity, and/or magnetic information to calculate quaternions that define the relative motion of an object in four-dimensional (4D) space. Quaternions can be efficiently computed to determine velocity (both device direction and speed).

More generally, however, any scheme for detecting device velocity (direction and speed) may be substituted with equal success for any of the foregoing tasks. While the foregoing techniques are described in the context of an inertial measurement unit (IMU) that provides quaternion vectors, artisans of ordinary skill in the related arts will readily appreciate that raw data (acceleration, rotation, magnetic field) and any of their derivatives may be substituted with equal success.

Generalized Operation of the Sensor Subsystem

In one embodiment, the sensor subsystem includes logic that is configured to obtain supplemental information and provide the supplemental information to the control and data subsystem in real-time (or near real-time).

Within the context of the present disclosure, the term "primary" refers to data that is captured to be encoded as media. The term "supplemental" refers to data that is captured or generated to guide the encoding of the primary data. In one exemplary embodiment, a camera captures image data as its primary data stream; additionally, the camera may capture or generate inertial measurements, telemetry data, and/or low-resolution video as a supplemental data stream to guide the encoding of the primary data stream. More generally, however, the techniques may be applied to primary data of any modality (e.g., audio, visual, haptic, etc.). For example, a directional or stereo microphone may capture audio waveforms as its primary data stream, and inertial measurements and/or other telemetry data as a supplemental data stream for use during subsequent audio channel encoding. Additionally, while the discussions presented throughout are discussed in the context of media that is suitable for human consumption, the techniques may be applied with equal success for other types of environmental data (e.g., temperature, LiDAR, RADAR, SONAR, etc.). Such data may be useful in applications including without limitation: computer vision, industrial automation, self-driving cars, internet of things (IoT), etc.

In some embodiments, the supplemental information may be directly measured. For example, a camera may capture a light information, a microphone may capture acoustic waveforms, an inertial measurement unit may capture orientation and/or motion, etc. In other embodiments, the supplemental information may be indirectly measured or otherwise inferred. For example, some image sensors can infer the presence of a human face or object via on-board logic. Additionally, many camera apparatus collect information for e.g., autofocus, color correction, white balance, and/or other automatic image enhancements. Similarly, certain acoustic sensors can infer the presence of human speech.

More generally, any supplemental data that may be used to infer characteristics of the primary data may be used to guide encoding. Techniques for inference may include known relationships as well as relationships gleaned from statistical analysis, machine learning, patterns of use/re-use, etc.

In some embodiments, the supplemental information may be provided via a shared memory access. For example, supplemental data may be written to a circular buffer; downstream processing may retrieve the supplemental data before it is overwritten. In other embodiments, the supplemental information may be provided via a dedicated data structure (e.g., data packets, metadata, data tracks etc.). Still other embodiments may use transitory signaling techniques; examples may include e.g., hardware-based interrupts, mailbox-based signaling, etc.

Functional Overview of the User Interface Subsystem

Functionally, the user interface subsystem 624 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 624 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

Other user interface subsystem 624 implementations may multiply, combine, further sub-divide, augment, and/or subsume the foregoing functionalities within these or other subsystems. For example, the audio input may incorporate elements of the microphone (discussed above with respect to the sensor subsystem). Similarly, IMU based input may incorporate the aforementioned IMU to measure "shakes", "bumps" and other gestures.

In some embodiments, the user interface subsystem 624 is an integral part of the encoding device 600. In other embodiments, the user interface subsystem may be augmented by external devices (such as the decoding device 700, discussed below) and/or removably attached components (e.g., hot-shoe/cold-shoe attachments, etc.). The following sections provide detailed descriptions of the individual components of the sensor subsystem.

Touchscreen and Buttons Implementation and Design Considerations

In some embodiments, the user interface subsystem 624 may include a touchscreen panel. A touchscreen is an assembly of a touch-sensitive panel that has been overlaid on a visual display. Typical displays are liquid crystal displays (LCD), organic light emitting diodes (OLED), and/or active-matrix OLED (AMOLED). Touchscreens are commonly used to enable a user to interact with a dynamic display, this provides both flexibility and intuitive user interfaces. Within the context of action cameras, touchscreen displays are especially useful because they can be sealed (waterproof, dust-proof, shock-proof, etc.)

Most commodity touchscreen displays are either resistive or capacitive. Generally, these systems use changes in resistance and/or capacitance to sense the location of human finger(s) or other touch input. Other touchscreen technologies may include, e.g., surface acoustic wave, surface capacitance, projected capacitance, mutual capacitance, and/or self-capacitance. Yet other analogous technologies may include, e.g., projected screens with optical imaging and/or computer-vision.

In some embodiments, the user interface subsystem 624 may also include mechanical buttons, keyboards, switches, scroll wheels and/or other mechanical input devices. Mechanical user interfaces are usually used to open or close a mechanical switch, resulting in a differentiable electrical signal. While physical buttons may be more difficult to seal against the elements, they are nonetheless useful in low-power applications since they do not require an active electrical current draw. For example, many Bluetooth Low Energy (BLE) applications may be triggered by a physical button press to further reduce graphical user interface (GUI) power requirements.

More generally, however, any scheme for detecting user input may be substituted with equal success for any of the foregoing tasks. While the foregoing techniques are described in the context of a touchscreen and physical buttons that enable user data entry, artisans of ordinary skill in the related arts will readily appreciate that any of their derivatives may be substituted with equal success.

Microphone/Speaker Implementation and Design Considerations

Audio input may incorporate a microphone and codec (discussed above) with a speaker. As previously noted, the microphone can capture and convert audio for voice commands. For audible feedback, the audio codec may obtain audio data and decode the data into an electrical signal. The electrical signal can be amplified and used to drive the speaker to generate acoustic waves.

As previously noted, the microphone and speaker may have any number of microphones and/or speakers for beamforming. For example, two speakers may be used to provide stereo sound. Multiple microphones may be used to collect both the user's vocal instructions as well as the environmental sounds.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium.) The data interfaces are configured to read/write data to a removeable non-transitory computer-readable medium (e.g., flash drive or similar memory media).

The illustrated network/data interface 626 may include network interfaces including, but not limited to: Wi-Fi, Bluetooth, Global Positioning System (GPS), USB, and/or Ethernet network interfaces. Additionally, the network/data interface 626 may include data interfaces such as: SD cards (and their derivatives) and/or any other optical/electrical/magnetic media (e.g., MMC cards, CDs, DVDs, tape, etc.).

Network Interface Implementation and Design Considerations

The communication subsystem including the network/data interface 626 of the encoding device 600 may include one or more radios and/or modems. As used herein, the term "modem" refers to a modulator-demodulator for converting computer data (digital) into a waveform (baseband analog). The term "radio" refers to the front-end portion of the modem that upconverts and/or downconverts the baseband analog waveform to/from the RF carrier frequency.

As previously noted, communication subsystem with network/data interface 626 may include wireless subsystems (e.g., $5^{th}/6^{th}$ Generation (5G/6G) cellular networks, Wi-Fi, Bluetooth (including, Bluetooth Low Energy (BLE) communication networks), etc.). Furthermore, the techniques described throughout may be applied with equal success to wired networking devices. Examples of wired communications include without limitation Ethernet, USB, PCI-e. Additionally, some applications may operate within mixed environments and/or tasks. In such situations, the multiple different connections may be provided via multiple different communication protocols. Still other network connectivity solutions may be substituted with equal success.

More generally, any scheme for transmitting data over transitory media may be substituted with equal success for any of the foregoing tasks.

Data Interface Implementation and Design Considerations

The communication subsystem of the encoding device 600 may include one or more data interfaces for removeable media. In one exemplary embodiment, the encoding device 600 may read and write from a Secure Digital (SD) card or similar card memory.

While the foregoing discussion is presented in the context of SD cards, artisans of ordinary skill in the related arts will readily appreciate that other removeable media may be substituted with equal success (flash drives, MMC cards, etc.). Furthermore, the techniques described throughout may be applied with equal success to optical media (e.g., DVD, CD-ROM, etc.).

More generally, any scheme for storing data to non-transitory media may be substituted with equal success for any of the foregoing tasks.

Functional Overview of the Control and Data Processing Subsystem

Functionally, the control and data processing subsystems are used to read/write and store data to effectuate calculations and/or actuation of the sensor subsystem, user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 6, the control and data subsystem may include one or more of: a central processing unit (CPU 606), an image signal processor (ISP 602), a graphics processing unit (GPU 604), a codec 608, and a non-transitory computer-readable medium 628 that stores program instructions and/or data.

Processor-Memory Implementations and Design Considerations

As a practical matter, different processor architectures attempt to optimize their designs for their most likely usages. More specialized logic can often result in much higher performance (e.g., by avoiding unnecessary operations, memory accesses, and/or conditional branching). For example, a general-purpose CPU (such as shown in FIG. 6) may be primarily used to control device operation and/or perform tasks of arbitrary complexity/best-effort. CPU operations may include, without limitation: general-purpose operating system (OS) functionality (power management, UX), memory management, etc. Typically, such CPUs are selected to have relatively short pipelining, longer words (e.g., 32-bit, 64-bit, and/or super-scalar words), and/or addressable space that can access both local cache memory and/or pages of system virtual memory. More directly, a CPU may often switch between tasks, and must account for branch disruption and/or arbitrary memory access.

In contrast, the image signal processor (ISP) performs many of the same tasks repeatedly over a well-defined data structure. Specifically, the ISP maps captured camera sensor data to a color space. ISP operations often include, without limitation: demosaicing, color correction, white balance, and/or auto exposure. Most of these actions may be done with scalar vector-matrix multiplication. Raw image data has a defined size and capture rate (for video) and the ISP operations are performed identically for each pixel; as a result, ISP designs are heavily pipelined (and seldom branch), may incorporate specialized vector-matrix logic, and often rely on reduced addressable space and other task-specific optimizations. ISP designs only need to keep up with the camera sensor output to stay within the real-time budget; thus, ISPs more often benefit from larger register/data structures and do not need parallelization. In many cases, the ISP may locally execute its own real-time operating system (RTOS) to schedule tasks of according to real-time constraints.

Much like the ISP, the GPU is primarily used to modify image data and may be heavily pipelined (seldom branches) and may incorporate specialized vector-matrix logic. Unlike the ISP however, the GPU often performs image processing acceleration for the CPU, thus the GPU may need to operate on multiple images at a time and/or other image processing tasks of arbitrary complexity. In many cases, GPU tasks may be parallelized and/or constrained by real-time budgets. GPU operations may include, without limitation: stabilization, lens corrections (stitching, warping, stretching), image corrections (shading, blending), noise reduction (filtering, etc.). GPUs may have much larger addressable space that can access both local cache memory and/or pages of system virtual memory. Additionally, a GPU may include multiple parallel cores and load balancing logic to e.g., manage power consumption and/or performance. In some cases, the GPU may locally execute its own operating system to schedule tasks according to its own scheduling constraints (pipelining, etc.).

The hardware codec converts image data to an encoded data for transfer and/or converts encoded data to image data for playback. Much like ISPs, hardware codecs are often designed according to specific use cases and heavily commoditized. Typical hardware codecs are heavily pipelined, may incorporate discrete cosine transform (DCT) logic (which is used by most compression standards), and often have large internal memories to hold multiple frames of video for motion estimation (spatial and/or temporal). As with ISPs, codecs are often bottlenecked by network connectivity and/or processor bandwidth, thus codecs are seldom parallelized and may have specialized data structures (e.g., registers that are a multiple of an image row width, etc.). In some cases, the codec may locally execute its own operating system to schedule tasks according to its own scheduling constraints (bandwidth, real-time frame rates, etc.).

Other processor subsystem implementations may multiply, combine, further sub-divide, augment, and/or subsume the foregoing functionalities within these or other processing elements. For example, multiple ISPs may be used to service multiple camera sensors. Similarly, codec functionality may be subsumed with either GPU or CPU operation via software emulation.

In one embodiment, the memory subsystem may be used to store data locally at the encoding device 600. In one exemplary embodiment, data may be stored as non-transitory symbols (e.g., bits read from non-transitory computer-readable mediums). In one specific implementation, the memory subsystem including non-transitory computer-readable medium 628 is physically realized as one or more physical memory chips (e.g., NAND/NOR flash) that are logically separated into memory data structures. The memory subsystem may be bifurcated into program code 630 and/or program data 632. In some variants, program code and/or program data may be further organized for dedicated and/or collaborative use. For example, the GPU and CPU may share a common memory buffer to facilitate large transfers of data therebetween. Similarly, the codec may have a dedicated memory buffer to avoid resource contention.

In some embodiments, the program code may be statically stored within the encoding device 600 as firmware. In other embodiments, the program code may be dynamically stored (and changeable) via software updates. In some such variants, software may be subsequently updated by external parties and/or the user, based on various access permissions and procedures.

Neural Network and Machine Learning Implementations

Unlike traditional "Turing"-based processor architectures (discussed above), neural network processing emulates a network of connected nodes (also known as "neurons") that loosely model the neuro-biological functionality found in the human brain. While neural network computing is still in its infancy, such technologies already have great promise for e.g., compute rich, low power, and/or continuous processing applications.

Each processor node of the neural network is a computation unit that may have any number of weighted input connections, and any number of weighted output connections. The inputs are combined according to a transfer function to generate the outputs. In one specific embodiment, each processor node of the neural network combines its inputs with a set of coefficients (weights) that amplify or dampen the constituent components of its input data. The input-weight products are summed and then the sum is passed through a node's activation function, to determine the size and magnitude of the output data. "Activated" neurons (processor nodes) generate output data. The output data may be fed to another neuron (processor node) or result in an action on the environment. Coefficients may be iteratively updated with feedback to amplify inputs that are beneficial, while dampening the inputs that are not.

Many neural network processors emulate the individual neural network nodes as software threads, and large vector-matrix multiply accumulates. A "thread" is the smallest discrete unit of processor utilization that may be scheduled for a core to execute. A thread is characterized by: (i) a set of instructions that is executed by a processor, (ii) a program counter that identifies the current point of execution for the thread, (iii) a stack data structure that temporarily stores thread data, and (iv) registers for storing arguments of opcode execution. Other implementations may use hardware or dedicated logic to implement processor node logic, however neural network processing is still in its infancy (circa 2022) and has not yet become a commoditized semiconductor technology.

As used herein, the term "emulate" and its linguistic derivatives refers to software processes that reproduce the function of an entity based on a processing description. For example, a processor node of a machine learning algorithm may be emulated with "state inputs", and a "transfer function", that generate an "action."

Unlike the Turing-based processor architectures, machine learning algorithms learn a task that is not explicitly described with instructions. In other words, machine learning algorithms seek to create inferences from patterns in data using e.g., statistical models and/or analysis. The inferences may then be used to formulate predicted outputs that can be compared to actual output to generate feedback. Each iteration of inference and feedback is used to improve the underlying statistical models. Since the task is accomplished through dynamic coefficient weighting rather than explicit instructions, machine learning algorithms can change their behavior over time to e.g., improve performance, change tasks, etc.

Typically, machine learning algorithms are "trained" until their predicted outputs match the desired output (to within a threshold similarity). Training may occur "offline" with batches of prepared data or "online" with live data using system pre-processing. Many implementations combine offline and online training to e.g., provide accurate initial performance that adjusts to system-specific considerations over time.

In one exemplary embodiment, a neural network processor (NPU) may be trained to determine camera motion, scene motion, the level of detail in the scene, and the presence of certain types of objects (e.g., faces). Once the NPU has "learned" appropriate behavior, the NPU may be used in real-world scenarios. NPU-based solutions are often more resilient to variations in environment and may behave reasonably even in unexpected circumstances (e.g., similar to a human.)

Generalized Operation of the Processing Pipeline

While the foregoing discussion is presented within the context of an image processing pipeline that includes a first image correction stage (RAW to YUV conversion, white balance, color correction, etc.) and a second image stabilization stage, the techniques may be broadly extended to any media processing pipeline. As used herein, the term "pipeline" refers to a set of processing elements that process data in sequence, such that each processing element may also operate in parallel with the other processing elements. For example, a 3-stage pipeline may have first, second, and third processing elements that operate in parallel. During operation, the input of a second processing element includes at least the output of a first processing element, and the output of the second processing element is at least one input to a third processing element. While the foregoing discussion is presented in the context of a pipeline with physical processing elements, artisans of ordinary skill in the related arts will readily appreciate that virtualized and/or software-based pipelines may be substituted with equal success.

In one embodiment, the non-transitory computer-readable medium includes a routine that enables real-time (or near real-time) guided encoding. When executed by the control and data subsystem, the routine causes the encoding device to: obtain real-time (or near real-time) information; determine encoder parameters based on the real-time information; configure an encoder with the encoder parameters; and provide the encoded media to the decoding device.

At step 642, real-time (or near real-time) information is obtained from another stage of the processing pipeline. In one embodiment, the information is generated according to real-time (or near real-time) constraints of the encoding device; for example, an embedded device may have a fixed buffer size that limits the amount of data that can be captured (e.g., a camera may only have a 1 second memory buffer for image data). In other cases, the encoding device may have a real-time operating system that imposes scheduling constraints in view tasks.

Various embodiments of the present disclosure distinguish between the primary data stream to be encoded and the supplemental data stream which may provide encoding guidance. In one embodiment, the supplemental data stream may include real-time (or near real-time) information is generated by a sensor. Examples of such information may include light information, acoustic information, and/or inertial measurement data. In other embodiments, the real-time (or near real-time) information may be determined from sensor data. For example, an image stabilization algorithm may generate motion vectors based on sensed inertial measurements. In other embodiments, an auto exposure, white balance, and color correction algorithms may be based on captured image data.

While the foregoing discussion is presented in the context of a "previous stage" of the pipeline, artisans of ordinary skill in the related arts will readily appreciate that some embodiments may obtain supplemental information from a subsequent stage of the pipeline. For example, live streaming embodiments may encode video for transmission over a network; in some situations, the modem might provide network capacity information to identify a bottleneck in data transfer capabilities (and by extension encoding complexity). As another example, computer vision applications (e.g., self-driving cars) may adjust encoding according to the application requirements, e.g., a neural network processor may provide encoding guidance based on object recognition from the image data, etc. As yet another example, a CPU might provide information from the OS on behalf of a user input received from the user interface.

More broadly, the supplemental data stream may include any real-time (or near real-time) information captured or generated by any subsystem of the encoding device. While the foregoing discussion has been presented in the context of ISP image correction data and GPU image stabilization data, artisans of ordinary skill in the related arts will readily appreciate that other supplemental information may come from the CPU, modem, neural network processors, and/or any other entity of the device.

Various embodiments of the present disclosure describe transferring data via memory buffers between pipeline elements. The memory buffers may be used to store both primary data and secondary data for processing. For example, the image processing pipeline (discussed above in FIG. 4), includes two DDR memory buffers which may store image data and any corresponding correction and stabilization data. While the foregoing discussion is presented in the context of FIFO (first-in-first-out) circular buffers, a variety of other memory organizations may be substituted with equal success. Examples may include e.g., last-in-first-out (LIFO), ping-pong buffers, stack (thread-specific), heap (thread-agnostic), and/or other memory organizations commonly used in the computing arts. More generally, however, any scheme for obtaining, providing, or otherwise transferring data between stages of the pipeline may be substituted with equal success. Examples may include shared mailboxes, packet-based delivery, bus signaling, interrupt-based signaling, and/or any other mode of communication.

As previously noted, real-time (and near real-time) processing is often subject to time-related constraints. In some embodiments, supplemental data may include explicit time-stamping or other messaging that directly associates it with corresponding primary data. This may be particularly useful for supplemental data of arbitrary or unknown timing (e.g., user input or neural network classifications provided via a stack or heap type data structure, etc.).

At step 644, an encoding parameter is determined based on the real-time (or near real-time) information. While the foregoing examples are presented in the context of quantization parameters, facial recognition, scene classification, region-of-interest (ROI) and/or GOP sizing/configuration, compression, and/or bit rate adjustments, a variety of encoding parameters may be substituted with equal success. Encoding parameters may affect e.g., complexity, latency, throughput, bit rate, media quality, data format, resolution, size, and/or any number of other media characteristics. More generally, any numerical value that modifies the manner in which the encoding is performed and/or the output of the encoding process may be substituted with equal success.

In one embodiment, the encoding parameters may be generated in advance and retrieved from a look-up-table or similar reference data structure. In other embodiments, the encoding parameters may be calculated according to heuristics or algorithms. In still other embodiments, the encoding parameters may be selected from a history of acceptable parameters for similar conditions. Still other embodiments may use e.g., machine learning algorithms or artificial intelligence logic to select suitable configurations. In some embodiments, external entities (e.g., a network or decoding device) may provide additional guidance, a selection of acceptable parameters that the encoding device may select from, or even the encoding parameters themselves. More generally, however, any scheme for determining a parameter from information obtained from other pipeline elements may be substituted with equal success.

At step 646, an encoder is configured based on the encoding parameter. In one embodiment, an encoder may expose an application programming interface (API) that enables configuration of the encoder operation. In other embodiments, the encoder functionality may be emulated in software (software-based encoding) as a series of function calls; in such implementations, the encoding parameters may affect the configuration, sequence, and/or operation of the constituent function calls. Examples of such configurations may include, e.g., group of picture (GOP) configuration, temporal filters, output file structure, etc. In other examples, a live streaming application may use MPEG-2 HLS (HTTP Live Streaming) transport packets; depending on the motion and/or complexity of the images, the packet size may be adjusted. As another such example, an audio encoding may selectively encode directional or stereo channels based on the device stability (e.g., very unstable video might be treated as mono rather than directional/stereo, etc.).

Some encoder implementations may read-from/write-to external memories. In some such cases, the encoder parameters may be directly written into the encoder-accessible memory space. For example, initial motion vector estimates (from in-camera image stabilization) may be "seeded" into an encoder's working memory. As another such example, color correction data may be seeded into an encoder's color palette. In such implementations, the encoder may treat the seeded data as a "first pass" of an iterative process.

At step 648, the encoded media is provided to the decoding device. In some cases, the encoded media is written to a non-transitory computer-readable media. Common examples include e.g. a SD card or similar removeable memory. In other cases, the encoded media is transmitted via transitory signals. Common examples include wireless signals and/or wireline signaling.

Functional Overview of the Decoding Device

Functionally, a decoding device 700 refers to a device that can receive and process encoded data. The decoding device 700 has many similarities in operation and implementation to the encoding device 600 which are not further discussed; the following discussion provides a discussion of the internal operations, design considerations, and/or alternatives, that are specific to decoding device 700 operation.

Figure 7:
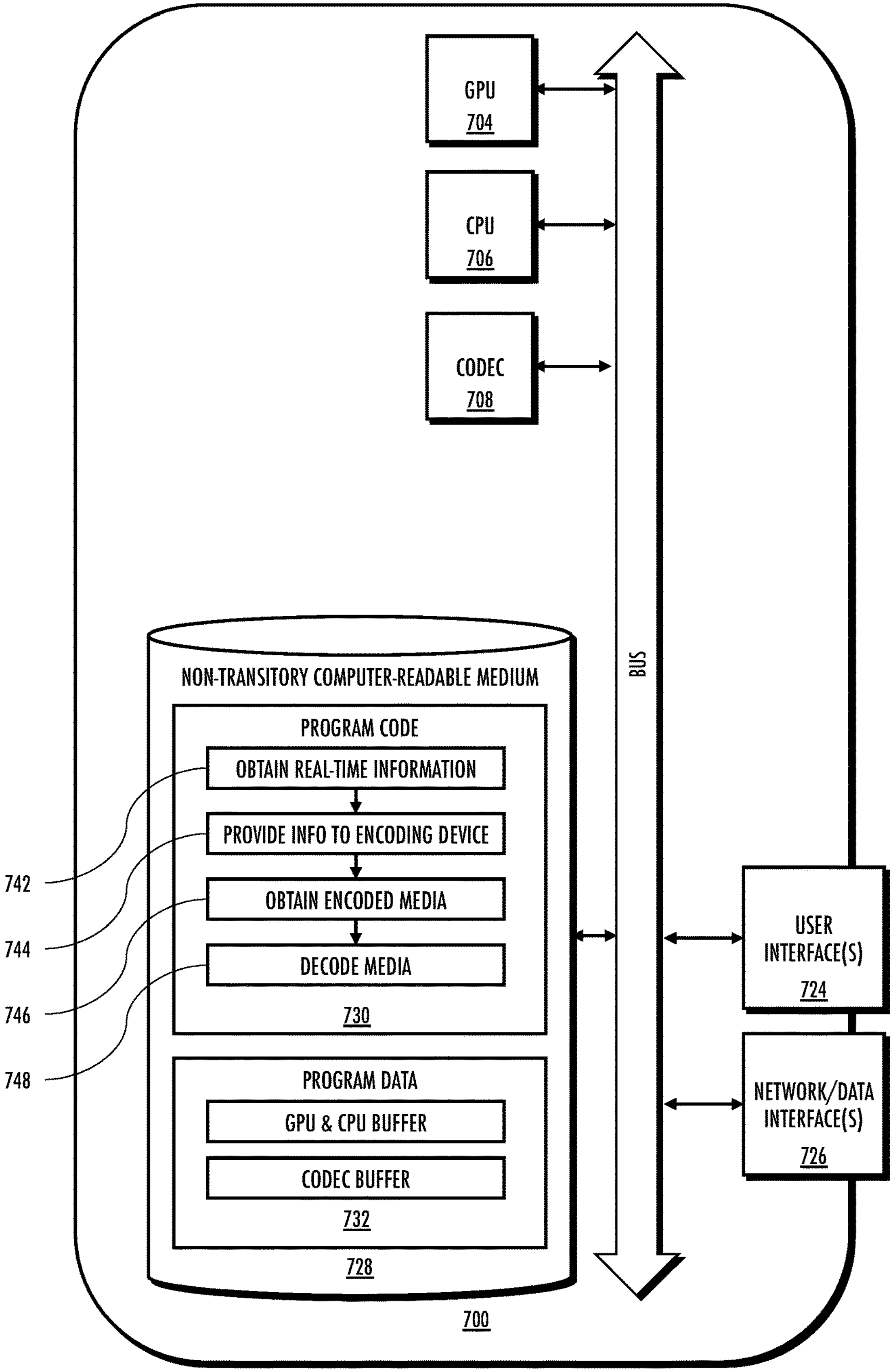
FIG. 7 is a logical block diagram of an exemplary decoding device, in accordance with various aspects of the present disclosure.

FIG. 7 is a logical block diagram of an exemplary decoding device 700. The decoding device 700 includes: a user interface subsystem, a communication subsystem, a control and data subsystem, and a bus to enable data transfer. The following discussion provides a specific discussion of the internal operations, design considerations, and/or alternatives, for each subsystem of the exemplary decoding device 700.

Functional Overview of the User Interface Subsystem

Functionally, the user interface subsystem 724 may be used to present media to, and/or receive input from, a human user. Media may include any form of audible, visual, and/or haptic content for consumption by a human. Examples include images, videos, sounds, and/or vibration. Input may include any data entered by a user either directly (via user entry) or indirectly (e.g., by reference to a profile or other source).

The illustrated user interface subsystem 724 may include: a touchscreen, physical buttons, and a microphone. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen).

User Interface Subsystem Considerations for Different Device Types

The illustrated user interface subsystem 724 may include user interfaces that are typical of the specific device types which include, but are not limited to: a desktop computer, a network server, a smart phone, and a variety of other devices are commonly used in the mobile device ecosystem including without limitation: laptops, tablets, smart phones, smart watches, smart glasses, and/or other electronic devices. These different device-types often come with different user interfaces and/or capabilities.

In laptop embodiments, user interface devices may include both keyboards, mice, touchscreens, microphones and/speakers. Laptop screens are typically quite large, providing display sizes well more than 2K (2560×1440), 4K (3840×2160), and potentially even higher. In many cases, laptop devices are less concerned with outdoor usage (e.g., water resistance, dust resistance, shock resistance) and often use mechanical button presses to compose text and/or mice to maneuver an on-screen pointer.

In terms of overall size, tablets are like laptops and may have display sizes well more than 2K (2560×1440), 4K (3840×2160), and potentially even higher. Tablets tend to eschew traditional keyboards and rely instead on touchscreen and/or stylus inputs.

Smart phones are smaller than tablets and may have display sizes that are significantly smaller, and non-standard. Common display sizes include e.g., 2400×1080, 2556×1179, 2796×1290, etc. Smart phones are highly reliant on touchscreens but may also incorporate voice inputs. Virtualized keyboards are quite small and may be used with assistive programs (to prevent mis-entry).

Smart watches and smart glasses have not had widespread market adoption but will likely become more popular over time. Their user interfaces are currently quite diverse and highly subject to implementation.

Functional Overview of the Communication Subsystem

Functionally, the communication subsystem may be used to transfer data to, and/or receive data from, external entities. The communication subsystem is generally split into network interfaces and removeable media (data) interfaces. The network interfaces are configured to communicate with other nodes of a communication network according to a communication protocol. Data may be received/transmitted as transitory signals (e.g., electrical signaling over a transmission medium). In contrast, the data interfaces are configured to read/write data to a removeable non-transitory computer-readable medium (e.g., flash drive or similar memory media).

The illustrated network/data interface 726 of the communication subsystem may include network interfaces including, but not limited to: Wi-Fi, Bluetooth, Global Positioning System (GPS), USB, and/or Ethernet network interfaces. Additionally, the network/data interface 726 may include data interfaces such as: SD cards (and their derivatives) and/or any other optical/electrical/magnetic media (e.g., MMC cards, CDs, DVDs, tape, etc.).

Functional Overview of the Control and Data Processing Subsystem

Functionally, the control and data processing subsystems are used to read/write and store data to effectuate calculations and/or actuation of the user interface subsystem, and/or communication subsystem. While the following discussions are presented in the context of processing units that execute instructions stored in a non-transitory computer-readable medium (memory), other forms of control and/or data may be substituted with equal success, including e.g., neural network processors, dedicated logic (field programmable gate arrays (FPGAs), application specific integrated circuits (ASICs)), and/or other software, firmware, and/or hardware implementations.

As shown in FIG. 7, the control and data subsystem may include one or more of: a central processing unit (CPU 706), a graphics processing unit (GPU 704), a codec 708, and a non-transitory computer-readable medium 728 that stores program instructions (program code 730) and/or program data 732 (including a GPU buffer, a CPU buffer, and a codec buffer). In some examples, buffers may be shared between processing components to facilitate data transfer.

Generalized Operation of the Decoding Device

In one embodiment, the non-transitory computer-readable medium 728 includes program code 730 with a routine that performs real-time (or near real-time) guidance to an encoding device. When executed by the control and data subsystem, the routine causes the decoding device to: obtain real-time (or near real-time) information; provide the real-time (or near real-time) information to the encoding device; obtain the encoded media; and decode the encoded media.

At step 742, the decoding device may determine real-time (or near real-time) information. As previously alluded to, some systems may allow the decoding device to impose real-time constraints on the encoding device. For example, a live streaming application may require a specific duration of video data delivered at set time intervals (e.g., 2 second clips, delivered every 2 seconds, etc.). As another example, certain wireless network technologies impose hard limits on the amount and/or timing of data. For example, cellular networks may allocate a specific bandwidth for a transmission time interval (TTI) to meet a specified quality of service (QoS). The decoding device may notify the encoding device of current network throughput; this may be particularly useful where neither device has any visibility into the network delivery mechanism.

At step 744, the decoding device may provide the real-time (or near real-time) information to an encoding device. In some embodiments, the real-time (or near real-time) information may be provided using a client-server based communication model running at an application layer (i.e., within an application executed by an operating system). Unfortunately, while application layer communications are often the most flexible framework, most applications are only granted best-effort delivery. Thus, other embodiments may provide the real-time (or near real-time) information via driver-level signaling mechanisms (i.e., within a driver executed by the operating system). While conventional driver frameworks are less flexible, the operating system has scheduling visibility and may guarantee real-time (or near real-time) performance.

At step 746, the decoding device 700 may obtain encoded media. In some embodiments, the video may be obtained via a removable storage media/a removable memory card or any network/data interface 726. For instance, video from an encoding device (e.g., encoding device 600) may be gathered by e.g., an internet server, a smartphone, a home computer, etc. and then transferred to the decoding device via either wired or wireless transfer. The video may then be transferred to the non-transitory computer-readable medium 728 for temporary storage during processing or for long term storage.

At step 748, the decoding device may decode the encoded media. In some embodiments, the results of the decoding may be used as feedback for the encoding device.

Functional Overview of the Communication Network

As used herein, a communication network 502 refers to an arrangement of logical nodes that enables data communication between endpoints (an endpoint is also a logical node). Each node of the communication network may be addressable by other nodes; typically, a unit of data (a data packet) may be traverse across multiple nodes in "hops" (a segment between two nodes). Functionally, the communication network enables active participants (e.g., encoding devices and/or decoding devices) to communicate with one another.

Communication Networks, Implementation and Design Considerations

Aspects of the present disclosure may use an ad hoc communication network to, e.g., transfer data between the encoding device 600 and the decoding device 700. For example, USB or Bluetooth connections may be used to transfer data. Additionally, the encoding device 600 and the decoding device 700 may use more permanent communication network technologies (e.g., Bluetooth BR/EDR, Wi-Fi, 5G/6G cellular networks, etc.). For example, an encoding device 600 may use a Wi-Fi network (or other local area network) to transfer media (including video data) to a decoding device 700 (including e.g., a smart phone) or other device for processing and playback. In other examples, the encoding device 600 may use a cellular network to transfer media to a remote node over the Internet. These technologies are briefly discussed below.

So-called 5G cellular network standards are promulgated by the 3$^{rd}$ Generation Partnership Project (3GPP) consortium. The 3GPP consortium periodically publishes specifications that define network functionality for the various network components. For example, the 5G system architecture is defined in 3GPP TS 23.501 (System Architecture for the 5G System (5GS), version 17.5.0, published Jun. 15, 2022; incorporated herein by reference in its entirety). As another example, the packet protocol for mobility management and session management is described in 3GPP TS 24.501 (Non-Access-Stratum (NAS) Protocol for 5G System (5G); Stage 3, version 17.5.0, published Jan. 5, 2022; incorporated herein by reference in its entirety).

Currently, there are three main application areas for the enhanced capabilities of 5G. They are Enhanced Mobile Broadband (eMBB), Ultra Reliable Low Latency Communications (URLLC), and Massive Machine Type Communications (mMTC).

Enhanced Mobile Broadband (eMBB) uses 5G as a progression from 4G LTE mobile broadband services, with faster connections, higher throughput, and more capacity. eMBB is primarily targeted toward traditional "best effort" delivery (e.g., smart phones); in other words, the network does not provide any guarantee that data is delivered or that delivery meets any quality of service. In a best-effort network, all users obtain best-effort service such that the overall network resource utilization is maximized. In these network slices, network performance characteristics such as network delay and packet loss depend on the current network traffic load and the network hardware capacity. When network load increases, this can lead to packet loss, retransmission, packet delay variation, and further network delay, or even timeout and session disconnect.

Ultra-Reliable Low-Latency Communications (URLLC) network slices are optimized for "mission critical" applications that require uninterrupted and robust data exchange. URLLC uses short-packet data transmissions which are easier to correct and faster to deliver. URLLC was originally envisioned to provide reliability and latency requirements to support real-time data processing requirements, which cannot be handled with best effort delivery.

Massive Machine-Type Communications (mMTC) was designed for Internet of Things (IoT) and Industrial Internet of Things (IIoT) applications. mMTC provides high connection density and ultra-energy efficiency. mMTC allows a single GNB to service many different devices with relatively low data requirements.

Wi-Fi is a family of wireless network protocols based on the IEEE 802.11 family of standards. Like Bluetooth, Wi-Fi operates in the unlicensed ISM band, and thus Wi-Fi and Bluetooth are frequently bundled together. Wi-Fi also uses a time-division multiplexed access scheme. Medium access is managed with carrier sense multiple access with collision avoidance (CSMA/CA). Under CSMA/CA, during Wi-Fi operation, stations attempt to avoid collisions by beginning transmission only after the channel is sensed to be "idle"; unfortunately, signal propagation delays prevent perfect channel sensing. Collisions occur when a station receives multiple signals on a channel at the same time and are largely inevitable. This corrupts the transmitted data and can require stations to re-transmit. Even though collisions prevent efficient bandwidth usage, the simple protocol and low cost has greatly contributed to its popularity. As a practical matter, Wi-Fi access points have a usable range of ~50 ft indoors and are mostly used for local area networking in best-effort, high throughput applications.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant, or implementation. The appearances of such phrases in various places in the specification are not necessarily all referring to the same embodiment, variant, or implementation.

As used herein, the term "computer program" or "software" is meant to include any sequence of human or machine cognizable steps which perform a function. Such program may be rendered in virtually any programming language or environment including, for example, Python, JavaScript, Java, C#/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An encoding device, comprising:

a camera configured to capture at least a first image and a second image;

an image processing pipeline comprising: a first processing element and an encoding element;

a first non-transitory computer-readable medium comprising a first set of instructions that, when executed by the first processing element, causes the first processing element to:

perform a first correction to the first image to generate a corrected first image, where the first correction to the first image is based on the second image; and determine a first encoding parameter based on the first correction; and a second non-transitory computer-readable medium comprising a second set of instructions that, when executed by the encoding element, causes the encoding element to generate encoded media based on the corrected first image and the first encoding parameter.

2. The encoding device of claim 1, where the first processing element comprises an image signal processor and the first correction comprises at least one of: an auto exposure, a color correction, or a white balance.

3. The encoding device of claim 2, further comprising:

a second processing element connected to the first processing element and the encoding element; and a third non-transitory computer-readable medium comprising a third set of instructions that, when executed by the second processing element, causes the second processing element to:

perform a second correction to the corrected first image; and determine a second encoding parameter based on the second correction, where the second set of instructions further causes the encoding element to generate the encoded media based on the second encoding parameter.

4. The encoding device of claim 1, further comprising a memory buffer and where the first processing element writes the first encoding parameter to the memory buffer and the encoding element reads the first encoding parameter from the memory buffer in-place.

5. The encoding device of claim 4, where the memory buffer is characterized by a single data rate mode and a double data rate mode, and where the first processing element writes the first encoding parameter to the memory buffer in the single data rate mode.

6. The encoding device of claim 4, where the memory buffer is characterized by a single data rate mode and a double data rate mode, and where the encoding element reads the first encoding parameter from the memory buffer in the single data rate mode.

7. A method for guiding an encoder in real-time, comprising:

receiving a first image and a second image captured by a camera device;

performing a first correction to the first image to generate a corrected first image, where the first correction to the first image is based on the second image;

providing data associated with the first correction that causes a processing element to determine a first encoding parameter; and providing the corrected first image to an encoding element to enable generation of encoded media based on the corrected first image and the first encoding parameter.

8. The method of claim 7, where:

an image signal processor performs the first correction of the first image, provides the data associated with the first correction, and provides the corrected first image to the encoding element, and the first correction comprises at least one of: an auto exposure, a color correction, or a white balance.

9. The method of claim 8, further comprising:

performing a second correction to the corrected first image by a second processing element different from the image signal processor; and determining a second encoding parameter based on the second correction by the second processing element.

10. The method of claim 9, further comprising:

causing, by the second processing element, the encoding element to generate the encoded media based on the second encoding parameter.

11. The method of claim 7, further comprising writing the first encoding parameter to a memory buffer.

12. The method of claim 11, further comprising reading, by the encoding element, the first encoding parameter from the memory buffer in-place.

13. An encoding device, comprising:

a camera configured to capture at least a first image and a second image;

an image processing pipeline comprising: a first processing element and an encoding element;

a second processing element;

a first non-transitory computer-readable medium comprising a first set of instructions that, when executed by the first processing element, causes the first processing element to perform a first correction to the first image to generate a corrected first image, where the first correction to the first image is based on the second image;

a second non-transitory computer-readable medium comprising a second set of instructions that, when executed by the second processing element, causes the encoding device to determine a first encoding parameter based on the first correction; and a third non-transitory computer-readable medium comprising a third set of instructions that, when executed by the encoding element, causes the encoding element to generate encoded media based on the corrected first image and the first encoding parameter.

14. The encoding device of claim 13, where the first processing element comprises an image signal processor and the first correction comprises at least one of: an auto exposure, a color correction, or a white balance.

15. The encoding device of claim 13, where the first correction comprises at least one of: an auto exposure setting, color space conversion statistics, motion vectors, temporal filter parameters, or facial detection parameters.

16. The encoding device of claim 13, further comprising:

a third processing element connected to the first processing element and the encoding element; and a fourth non-transitory computer-readable medium comprising a fourth set of instructions that, when executed by the third processing element, causes the third processing element to:

perform a second correction to the corrected first image; and determine a second encoding parameter based on the second correction, where the third set of instructions further causes the encoding element to generate the encoded media based on the second encoding parameter.

17. The encoding device of claim 13, further comprising a memory buffer and where the second processing element writes the first encoding parameter to the memory buffer and the encoding element reads the first encoding parameter from the memory buffer in-place.

18. The encoding device of claim 13, where the first image is captured according to a first real-time constraint and the first image is encoded according to a second real-time constraint.

* * * * *